(12) United States Patent
Kim et al.

(10) Patent No.: US 12,426,056 B2
(45) Date of Patent: Sep. 23, 2025

(54) METHOD AND APPARATUS FOR RECEIVING OR TRANSMITTING CONFIGURATION INFORMATION RELATED TO AT LEAST ONE TDRA ROW

(71) Applicant: LG ELECTRONICS INC., Seoul (KR)

(72) Inventors: Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 363 days.

(21) Appl. No.: 17/936,557

(22) Filed: Sep. 29, 2022

(65) Prior Publication Data

US 2023/0239886 A1 Jul. 27, 2023

(30) Foreign Application Priority Data

Jan. 7, 2022 (KR) .......... 10-2022-0002921

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .......... H04W 72/23; H04W 72/0446
See application file for complete search history.

(56) References Cited

U.S. PATENT DOCUMENTS

| | | | | |
|---|---|---|---|---|
| 2019/0149365 A1* | 5/2019 | Chatterjee | ............ | H04W 76/11 370/329 |
| 2019/0297637 A1* | 9/2019 | Liou | ................ | H04W 72/1273 |
| 2020/0351129 A1* | 11/2020 | Kwak | ................... | H04W 72/53 |
| 2020/0351841 A1* | 11/2020 | Cirik | .................... | H04L 1/0025 |
| 2021/0385831 A1* | 12/2021 | Nogami | ................ | H04W 72/23 |
| 2022/0046688 A1* | 2/2022 | Yang | ...................... | H04W 72/23 |
| 2022/0124732 A1* | 4/2022 | Park | ..................... | H04W 72/20 |
| 2022/0173867 A1* | 6/2022 | Nogami | ............... | H04L 5/0094 |
| 2022/0183038 A1* | 6/2022 | Saber | ................... | H04L 1/1896 |

(Continued)

OTHER PUBLICATIONS

Japan Patent Office Application No. 2022-170383, Notice of Allowance dated Dec. 19, 2023, 2 pages.

(Continued)

*Primary Examiner* — Jael M Ulysse
(74) *Attorney, Agent, or Firm* — LEE, HONG, DEGERMAN, KANG & WAIMEY

(57) ABSTRACT

A method and apparatus for performing communication in a wireless communication system are disclosed. In an embodiment of the present disclosure, a method for performing communication by a user equipment (UE) may include receiving, from a base station, configuration information related to at least one time domain resource allocation (TDRA) row including a plurality of start and length indicator values (SLIVs) for a physical downlink shared channel (PDSCH) and receiving, from the base station, first downlink control information (DCI), and the first DCI includes transmission configuration indicator (TCI) state indication information and does not include downlink (DL) assignment information, and a number of SLIVs in a specific TDRA row indicated by the first DCI among the at least one TDRA row is 1.

10 Claims, 13 Drawing Sheets

(56) References Cited

U.S. PATENT DOCUMENTS

| | | | | |
|---|---|---|---|---|
| 2022/0256573 A1* | 8/2022 | Frenne | ............... | H04W 72/23 |
| 2022/0287013 A1* | 9/2022 | Farag | ............... | H04L 5/0035 |
| 2023/0179354 A1* | 6/2023 | Muruganathan | ...... | H04L 5/0091 |
| | | | | 370/329 |
| 2023/0199891 A1* | 6/2023 | Ying | ............... | H04W 72/0446 |
| | | | | 370/329 |
| 2023/0209511 A1* | 6/2023 | Ying | ............... | H04W 72/23 |
| | | | | 370/329 |
| 2024/0032031 A1* | 1/2024 | Yi | ............... | H04W 72/1273 |
| 2024/0072975 A1* | 2/2024 | Rastegardoost | ...... | H04W 72/20 |
| 2024/0172229 A1* | 5/2024 | Gao | ............... | H04L 1/1812 |

OTHER PUBLICATIONS

Fujitsu, "Considerations on multi-PDSCH/PUSCH with a single DCI and HARQ for NR from 52.6 GHz to 71 Ghz," R1-2107033, 3GPP TSG RAN WG1 #106-e, e-Meeting, Aug. 2021, 16 pages.

CATT, "PDSCH/PUSCH enhancements for up to 71GHz operation," R1-2106960, 3GPP TSG RAN WG1 #106-e, e-Meeting, Aug. 2021, 18 pages.

ZTE et al., "Discussion on the beam management for 52.6 to 71 Ghz," R1-2107003, 3GPP TSG RAN WG1 #106-e, e-Meeting, Aug. 2021, 8 pages.

QUALCOMM Incorporated, "Enhancements on Multi-beam Operation," R1-2107323, 3GPP TSG RAN WG1 Meeting #106-e, Aug. 2021, 16 pages.

Sony, "Further enhancement on multi-beam operation," R1-2103287, 3GPP TSG RAN WG1#104bis, E-meeting, Apr. 2021, 20 pages.

* cited by examiner (a)

(b)

(a)

(b)

(c)

METHOD AND APPARATUS FOR RECEIVING OR TRANSMITTING CONFIGURATION INFORMATION RELATED TO AT LEAST ONE TDRA ROW

CROSS-REFERENCE TO RELATED APPLICATIONS

Pursuant to 35 U.S.C. § 119 (a), this application claims the benefit of an earlier filing date and right of priority to Korean Patent Application No. 10-2022-0002921, filed on Jan. 7, 2022, the contents of which are all hereby incorporated by reference herein in their entireties.

TECHNICAL FIELD

The present disclosure relates to a wireless communication system, and more particularly, to a method and apparatus for performing communication based on DCI for scheduling a plurality of PDSCHs in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for performing communication in a wireless communication system.

An additional technical object of the present disclosure is to provide a method and apparatus for transmitting and receiving HARQ-ACK corresponding to (multi) DCI for scheduling a plurality of PDSCHs.

An additional technical object of the present disclosure is to provide a method and apparatus for indicating a TDRA (time domain resource allocation) row index associated with a single SLIV when a TCI state is updated through M-DCI without PDSCH scheduling.

The technical objects to be achieved by the present disclosure are not limited to the above-described technical objects, and other technical objects which are not described herein will be clearly understood by those skilled in the pertinent art from the following description.

Technical Solution

In an embodiment of the present disclosure, a method for performing communication by a user equipment (UE) in a wireless communication system may include receiving, from a base station, configuration information related to at least one time domain resource allocation (TDRA) row including a plurality of start and length indicator values (SLIVs) for a physical downlink shared channel (PDSCH); and receiving, from the base station, first downlink control information (DCI), and the first DCI includes transmission configuration indicator (TCI) state indication information and does not include downlink (DL) assignment information, and a number of SLIVs in a specific TDRA row indicated by the first DCI among the at least one TDRA row is 1.

In an embodiment of the present disclosure, a method for performing communication in a wireless communication system by a base station may include transmitting, to a user equipment (UE), configuration information related to at least one time domain resource allocation (TDRA) row including a plurality of start and length indicator values (SLIVs) for a physical downlink shared channel (PDSCH); and transmitting, to the UE, first downlink control information (DCI), the first DCI includes transmission configuration indicator (TCI) state indication information and does not include downlink (DL) assignment information, and a number of SLIVs in a specific TDRA row indicated by the first DCI among the at least one TDRA row is 1.

[Technical Effects]

According to an embodiment of the present disclosure, a method and apparatus for performing communication in a wireless communication system may be provided.

According to an embodiment of the present disclosure, a method and apparatus for transmitting and receiving HARQ-ACK corresponding to DCI (M-DCI) for scheduling a plurality of PDSCHs may be provided.

According to an embodiment of the present disclosure, by supporting scheduling for transmission of a plurality of PDSCHs through M-DCI, transmission efficiency of scheduling DCI for PDSCH and/or PUSCH may be increased.

According to an embodiment of the present disclosure, when the TCI state is updated through M-DCI without PDSCH scheduling, a method and apparatus for indicating a TDRA row index associated with a single SLIV may be provided.

According to an embodiment of the present disclosure, even if TCI status update without PDSCH scheduling is indicated through M-DCI, as only one resource for one PDSCH is scheduled by the corresponding DCI, ambiguity according to the HARQ-ACK codebook configuration of the UE may be resolved.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
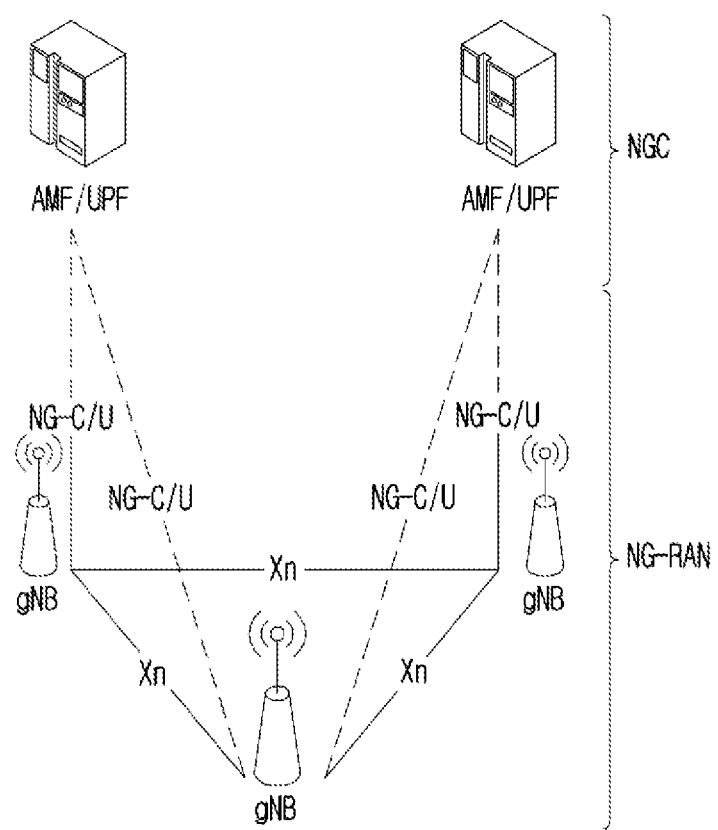
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN (New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information-reference signal resource indicator
CSI: channel state information
CSI-IM: channel state information-interference measurement
CSI-RS: channel state information-reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
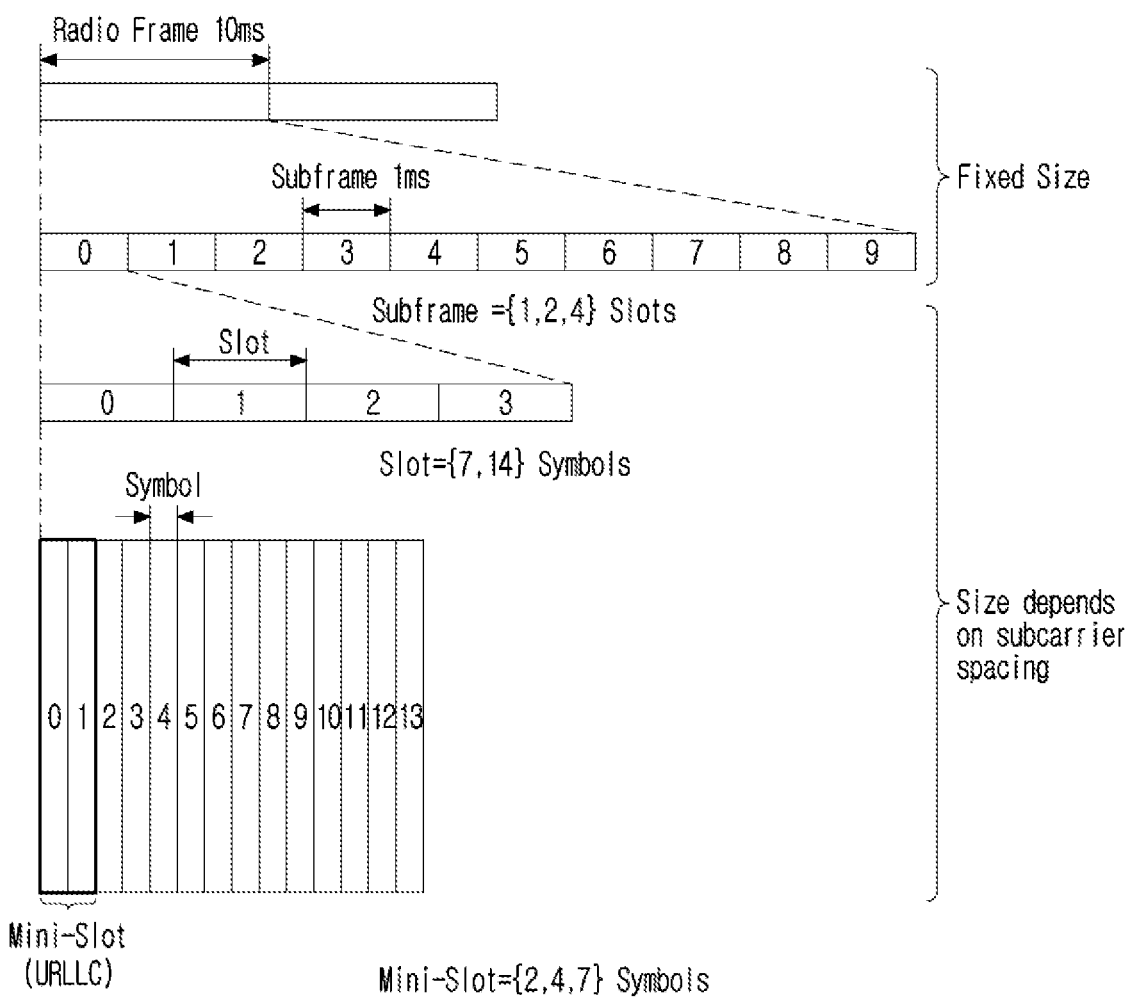
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, u). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c = 1/(\Delta f_{max} \cdot N_f)$. Here, $\Delta f_{max}$ is 480·103 Hz and $N_f$ is 4096. Downlink and uplink transmission is configured (organized) with a radio frame having a duration of $T_f = 1/(\Delta f_{max} N_f / 100) \cdot T_c = 10$ ms. Here, a radio frame is configured with 10 subframes having a duration of $T_{sf} = (\Delta f_{max} N_f / 1000) \cdot T_c = 1$ ms, respectively. In this case, there may be one set of frames for an uplink and one set of frames for a downlink.

In addition, transmission in an uplink frame No. i from a terminal should start earlier by $T_{TA} = (N_{TA} + N_{TA,offset}) T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu} - 1\}$ in a subframe and are numbered in an increasing order of $n_{s,f}^\mu \in \{0, \ldots, N_{slot}^{frame,\mu} - 1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe.

All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered.

Hereinafter, the physical resources which may be considered in an NR system will be described in detail. First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship.

In this case, the large-scale property includes at least one of delay spread, doppler spread, frequency shift, average received power, received timing.

Figure 3:
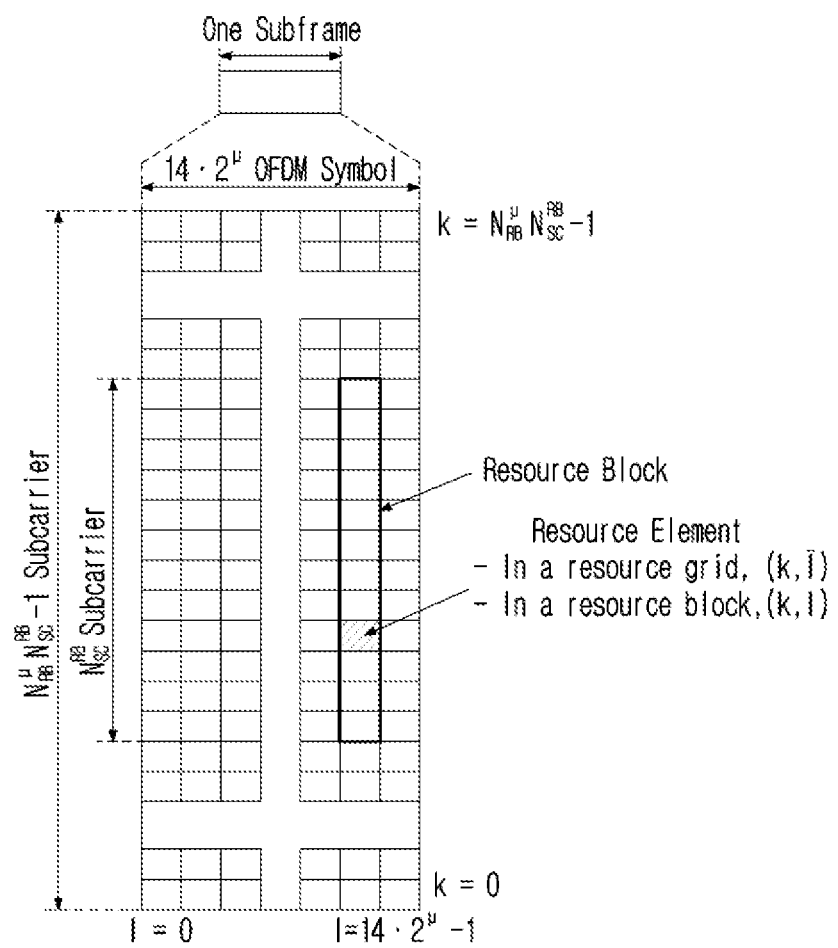
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto.

In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l').

Here, $k=0, \ldots, N_{RB}^\mu N_{sc}^{RB} - 1$ is an index in a frequency domain and $l'=0, \ldots, 2^\mu N_{symb}^{(\mu)} - 1$ refers to a position of a symbol in a subframe. When referring to a resource element in a slot, an index pair (k,l) is used. Here, $l=0, \ldots, N_{symb}^\mu - 1$. A resource element (k,l') for u and an antenna port p corresponds to a complex value, $a_{k,l'}^{(p,\mu)}$.

When there is no risk of confusion or when a specific antenna port or numerology is not specified, indexes p and u may be dropped, whereupon a complex value may be $a_{k,l}^{(p)}$ or $a_{k,l}$. In addition, a resource block (RB) is defined as $N_{sc}^{RB}=12$ consecutive subcarriers in a frequency domain. Point A plays a role as a common reference point of a resource block grid and is obtained as follows. offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2. absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration u is identical to 'point A'.

A relationship between a common resource block number nCRBμ and a resource element (k,l) for a subcarrier spacing configuration u in a frequency domain is given as in the following Equation 1.

$$n_{CRB}^{\mu} = \left\lfloor \frac{k}{N_{SC}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n\mu_{CRB} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
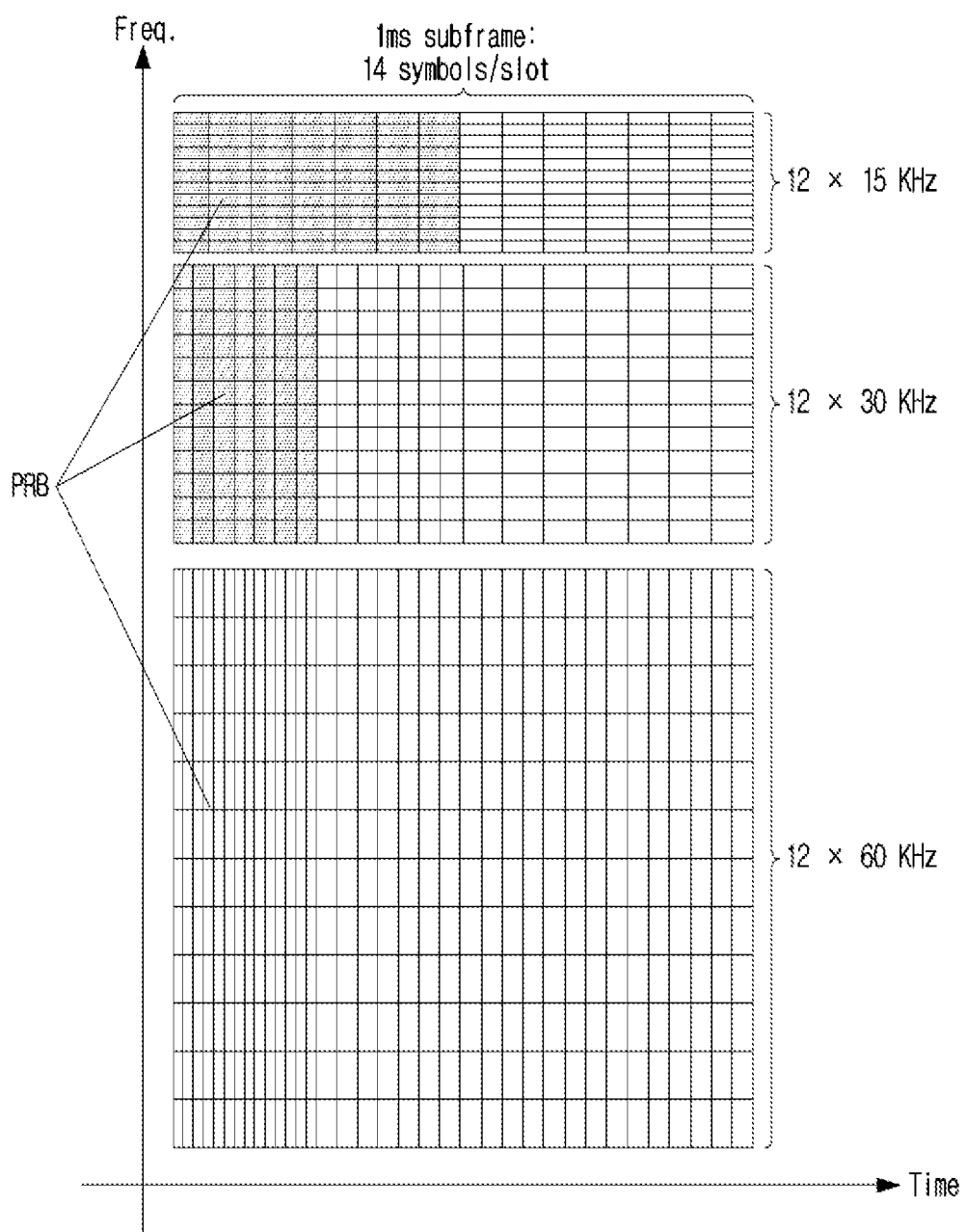
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
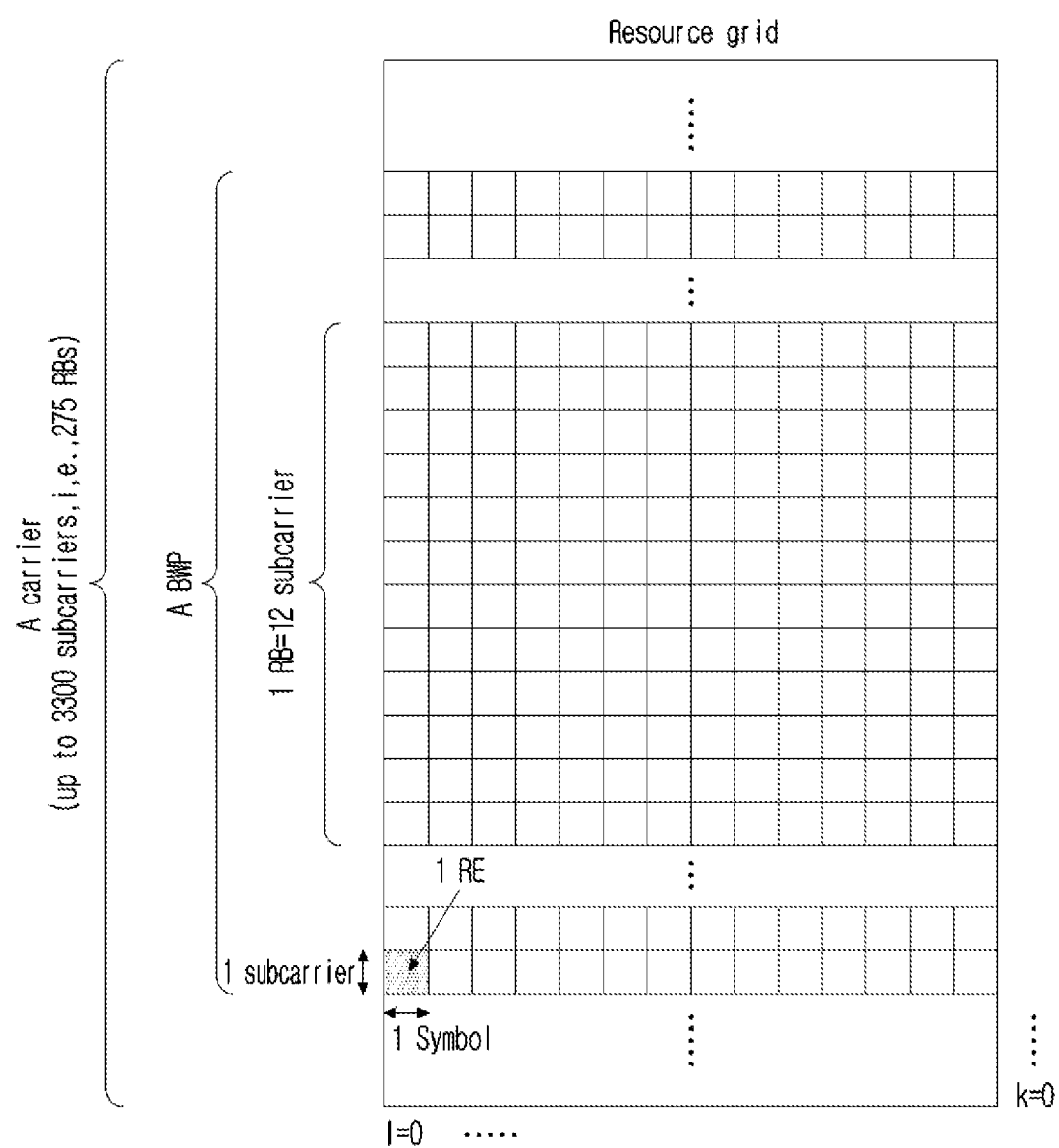
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.).

A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC.

Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP.

Alternatively, when UEs are congested in a specific BWP, some terminals may be configured with other BWP for load balancing.

Alternatively, considering frequency domain inter-cell interference cancellation between neighboring cells, etc., some middle spectrums of a full bandwidth may be excluded and BWPs on both edges may be configured in the same slot.

In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.).

Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
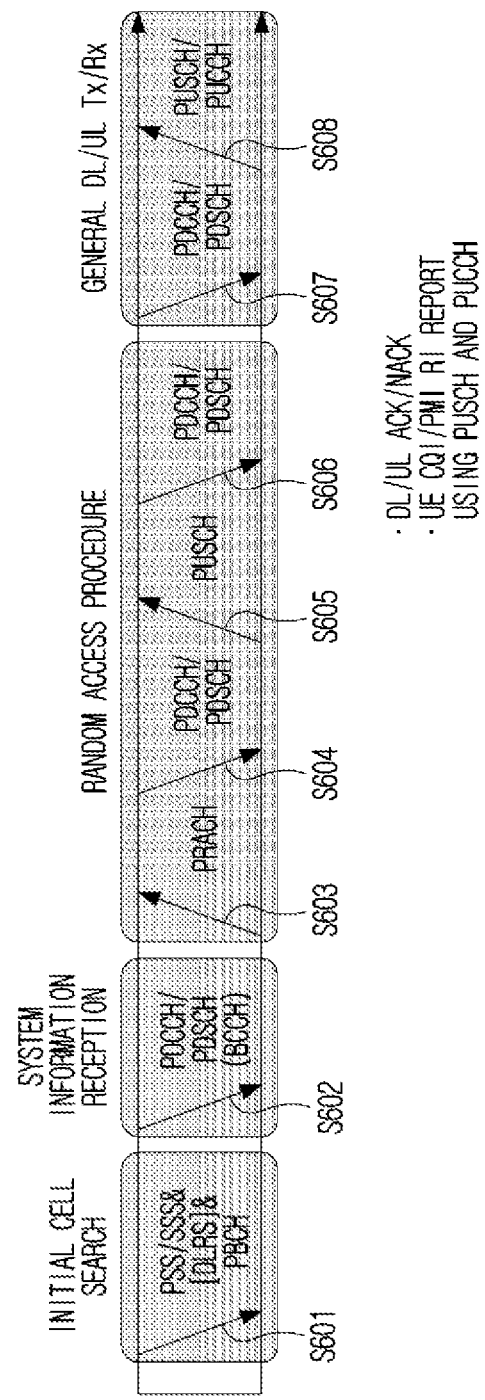
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Figure 7:
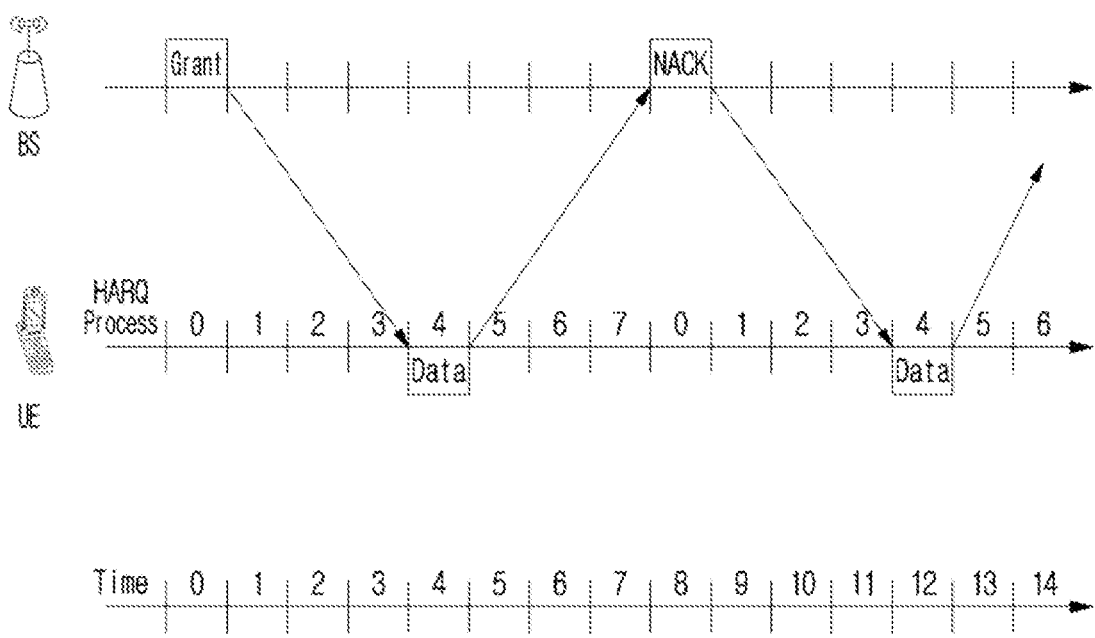
FIG. 7 illustrates a process in which a UE and a base station transmit and receive HARQ-ACK in a wireless communication system to which the present disclosure may be applied.

FIG. 7 illustrates a hybrid automatic repeat and request (HARQ) transmission method to which the present disclosure may be applied.

When a plurality of terminals having data to be transmitted through uplink (UL)/downlink (DL) exist in a wireless communication system, the base station may select a terminal to transmit data to for each TTI (transmission time interval) (e.g., subframe, slot). In a multi-carrier and similarly operated wireless communication system, the base station may select terminals to transmit data through UL/DL for each TTI, and may also select a frequency band to be used by the corresponding terminal to transmit data.

For example, the terminals may transmit RS (or pilot signals) through the UL, and the base station may determine the channel state of the terminals using the RS (or pilot signals) transmitted from the terminals. In addition, the base station may select terminals to transmit data in the UL in the unit frequency band for each TTI, and transmit the selection result to the terminal. That is, the base station may transmit an uplink assignment message (i.e., a UL grant message) to a terminal scheduled for UL at a specific TTI by using a specific frequency band.

The terminal may transmit data to the base station according to the UL grant message. Here, the UL grant message may include, for example, terminal (or, UE) Identity, RB allocation information, MCS (Modulation and Coding Scheme), Redundancy Version (RV) version, New Data indication (NDI), and the like.

HARQ may include DL HARQ and UL HARQ. DL HARQ may mean DL data on PDSCH transmitted together with HARQ-ACK returned on PUCCH or PUSCH. UL HARQ may mean UL data on PUSCH transmitted together with HARQ-ACK returned on PDCCH.

A plurality of parallel HARQ processes may exist in the base station/terminal for DL/UL transmission. A plurality of parallel HARQ processes may allow DL/UL transmissions to be continuously performed while waiting for HARQ feedback on successful or non-successful reception of previous DL/UL transmissions.

Each HARQ process may be associated with a HARQ buffer of a MAC (Medium Access Control) layer. Each HARQ process may manage state variables related to the number of transmissions of a MAC PDU (physical data block) in the buffer, HARQ feedback for the MAC PDU in the buffer, and a current redundancy version.

For example, when using 8-channel HARQ, the HARQ process ID may be provided as 0-7. In the synchronous HARQ scheme, the HARQ process ID may be sequentially connected to a time unit (TU). On the other hand, in the asynchronous HARQ scheme, the HARQ process ID may be designated by a network (e.g., a base station) during data scheduling. Here, the TU may be replaced with a data transmission occasion (e.g., subframe, slot).

Among HARQ transmission schemes, an asynchronous HARQ scheme may mean that a fixed time pattern for each HARQ process does not exist. That is, since the HARQ retransmission time is not predefined, the base station may transmit a retransmission request message to the terminal.

Among HARQ transmission schemes, a synchronous HARQ scheme may have a fixed time pattern for each HARQ process. That is, the HARQ retransmission time may be predefined. Accordingly, the UL grant message transmitted from the base station to the terminal may be transmitted only initially, and subsequent retransmission may be performed by the ACK/NACK signal.

Among HARQ transmission schemes, in the case of the non-adaptive HARQ scheme, the frequency resource or MCS for retransmission is the same as the previous transmission, but in the case of the adaptive HARQ scheme, the frequency resource or MCS for retransmission may be different from the previous transmission. For example, in the case of the asynchronous adaptive HARQ scheme, since the frequency resource or MCS for retransmission varies for each transmission time, the retransmission request message may include UE ID, RB allocation information, HARQ process ID/number, RV, and NDI information.

Referring to FIG. 7, a base station (BS) may transmit a UL grant message to a UE through a PDCCH. The UE may transmit uplink data to the base station through the PUSCH using the RB and the MCS designated by the UL grant message after a predetermined time from the time of receiving the UL grant message.

Here, each of the base station and the UE shown in FIG. 7 may correspond to one of the first device 100 or the second device 200, which will be described with reference to FIG. 12.

The base station may decode the UL data received from the UE. When decoding of uplink data fails, the base station may transmit a NACK to the UE. The UE may retransmit the UL data after a predetermined time from the time of receiving the NACK. Initial transmission and retransmission of UL data may be performed by the same HARQ process (e.g., HARQ process 4).

In the synchronous HARQ scheme, the predetermined time may have a fixed value. On the other hand, in the synchronous HARQ scheme, the predetermined time may be indicated by PDCCH-to-PUSCH timing indication information in a UL grant message.

Figure 8:
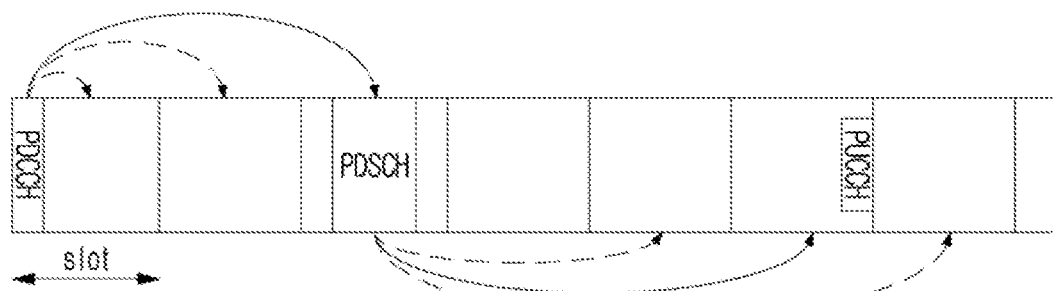
FIG. 8 illustrates an uplink and/or downlink transmission/reception process based on DCI in a wireless communication system to which the present disclosure may be applied.
Figure 8:
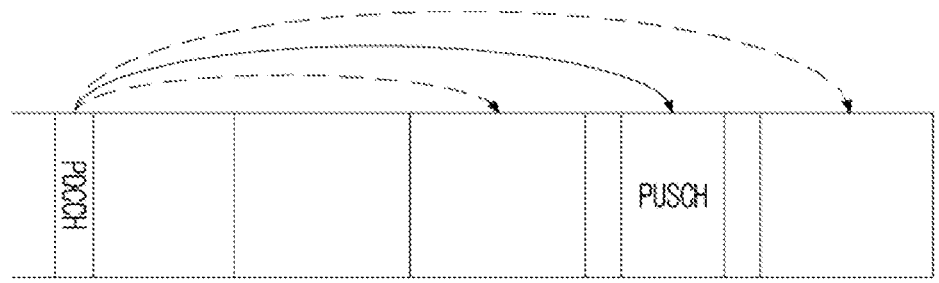

FIG. 8 illustrates a transmission process of uplink control information to which the present disclosure may be applied.

Referring to FIG. 8(a), the UE may detect the PDCCH in slot #n. Here, the PDCCH includes DL scheduling information (e.g., DCI formats 1_0, 1_1), and the PDCCH may indicate 'DL assignment-to-PDSCH offset (K0)' and 'PDSCH-HARQ-ACK reporting offset (K1)'.

Here, each of K0 and K1 may be indicated by a 'time domain resource assignment (TDRA) field' and a 'PDSCH-to-HARQ feedback timing indicator field' of DCI formats 1_0 and 1_1.

Specifically, the 'TDRA field' may indicate the start position (e.g., OFDM symbol index) and length (e.g., the number of OFDM symbols) of the PDSCH in the slot. The 'PDSCH-to-HARQ feedback timing indicator field' may indicate a position where HARQ-ACK reporting starts after the PDSCH is received.

And, DCI formats 1_0 and 1_1 include a 'PUCCH resource indicator (PRI) field' indicating a PUCCH resource to be used for UCI transmission among a plurality of PUCCH resources included in the PUCCH resource set.

After receiving the PDSCH from the base station in slot #(n+K0) according to the scheduling information of slot #n, the UE may transmit UCI to the base station through PUCCH in slot #(n+K1).

Here, the UCI may include HARQ-ACK feedback for the PDSCH. When the PDSCH is configured to transmit a maximum of 1 TB, the HARQ-ACK feedback may be configured with 1-bit. When the PDSCH is configured to transmit up to two TBs, the HARQ-ACK bit may be configured as 2-bits when spatial bundling is not configured, and may be configured as 1-bits when spatial bundling is configured. When the HARQ-ACK transmission time for a plurality of PDSCHs is designated as slot #(n+K1), the UCI transmitted in slot #(n+K1) may include HARQ-ACK responses for the plurality of PDSCHs.

Referring to FIG. 8(b), the UE may detect the PDCCH in slot #n. Here, the PDCCH may include uplink scheduling information (e.g., DCI formats 0_0, 0_1).

DCI format 0_0,0_1 may include a frequency domain resource assignment (FDRA) field indicating an RB set allocated to a PUSCH, a slot offset (K2), and a time domain resource assignment (TDRA) field indicating a start position (e.g., OFDM symbol index) and length (e.g., the number of OFDM symbols) of a PUSCH in a slot. Here, the start position and length of the PUSCH may be indicated together through a start and length indicator value (SLIV) or may be indicated respectively.

The UE may transmit the PUSCH to the base station in slot #(n+K2) according to the scheduling information of slot #n. Here, the PUSCH may include a UL-SCH TB. When the PUCCH transmission time and the PUSCH transmission time overlap, the UCI may be transmitted through the PUSCH (i.e., piggybacked to the PUSCH).

Dynamic/Semi-Static HARQ-ACK Codebook Configuration Method

In a wireless communication system, a dynamic HARQ-ACK codebook (e.g., Type-2 HARQ-ACK codebook) configuration scheme and a semi-static HARQ-ACK codebook (e.g., Type-1 HARQ-ACK codebook) configuration scheme may be supported. In describing the present disclosure, the HARQ-ACK (or A/N) codebook may be replaced with a HARQ-ACK payload.

When the dynamic HARQ-ACK codebook configuration method is configured, the size of the A/N payload may vary according to the actual number of scheduled DL data. To this end, the PDCCH related to DL scheduling may include a counter-DAI (Downlink Assignment Index) and total-DAI.

The counter-DAI indicates a {CC, slot} scheduling order value calculated in a CC (Component Carrier) (or cell)-first method, and may be used to designate the position of the A/N bit in the A/N codebook. total-DAI represents a slot-unit scheduling cumulative value up to the current slot, and may be used to determine the size of the A/N codebook.

When the semi-static A/N codebook configuration method is configured, the size of the A/N codebook may be fixed (to the maximum value) regardless of the actual number of scheduled DL data.

Specifically, the (maximum) A/N payload (size) transmitted through one PUCCH in one slot may be determined as the number of A/N bits corresponding to a combination of all CCs configured for the UE and all DL scheduling slots (or PDSCH transmission slot or PDCCH monitoring slot) (hereafter, the bundling window) to which the A/N transmission timing may be indicated.

For example, the DL grant DCI includes PDSCH-to-A/N timing information, and the PDSCH-to-A/N timing information may have one of a plurality of values (e.g., k). For example, when a PDSCH is received in slot #m, and PDSCH-to-A/N timing information in a DL grant DCI (PDCCH) scheduling the PDSCH indicates k, A/N information for the PDSCH may be transmitted in slot #(m+k).

As an example, $k \in \{1, 2, 3, 4, 5, 6, 7, 8\}$ may be given. When the A/N information is transmitted in slot #n, the A/N information may include the maximum possible A/N based on the bundling window. That is, A/N information of slot #n may include A/N corresponding to slot #(n-k).

For example, if $k \in \{1, 2, 3, 4, 5, 6, 7, 8\}$, the A/N information of slot #n includes A/N (i.e., the maximum number of A/Ns) corresponding to slots #(n-8) to #(n-1) regardless of actual DL data reception. Here, the A/N information may be replaced with an A/N codebook and an A/N payload.

In addition, the slot may be understood/replaced as a candidate occasion for DL data reception. As an example, the bundling window may be determined based on the PDSCH-to-A/N timing based on the A/N slot, and the PDSCH-to-A/N timing set may have a pre-defined value (e.g., {1, 2, 3, 4, 5, 6, 7, 8}) or may be configured by higher layer (RRC) signaling.

HARQ-ACK Codebook Configuration Method Based on Time Bundling Interval Configuration In order to increase the transmission efficiency of the scheduling DCI for the PDSCH/PUSCH, a plurality of PDSCH/PUSCH scheduling may be supported through one DCI. For convenience of description of the present disclosure, the corresponding DCI is referred to as M-DCI, and the DCI for scheduling a single PDSCH/PUSCH is referred to as S-DCI. However, a single PDSCH/PUSCH may be scheduled by M-DCI.

For example, when the time domain resource allocation (TDRA) entry of M-DCI is configured, it is assumed that only one SLIV is linked to row index #A, and a plurality of SLIVs are linked to another row index #B. When row index #A is indicated by M-DCI, M-DCI may schedule only a single PDSCH/PUSCH. On the other hand, when row index #B is indicated by M-DCI, M-DCI may schedule a plurality of PDSCHs/PUSCHs.

And, for convenience of description of the present disclosure, a case in which a PDSCH/PUSCH is scheduled by S-DCI and a case in which only one PDSCH/PUSCH is scheduled by M-DCI (or, when SPS PDSCH release, secondary cell (SCell) dormancy, or TCI status update is indicated by DCI) is referred to as a single PDSCH/PUSCH case. And, a case in which a plurality of PDSCHs/PUSCHs are scheduled by M-DCI is referred to as a multi-PDSCH/PUSCH case.

The present disclosure describes a scheduling method for a plurality of PDSCHs/PUSCHs in a multi-PDSCH/PUSCH case and a method of configuring a HARQ-ACK codebook corresponding to M-DCI.

When time bundling is configured in addition to the M-DCI configuration, the number of bundling groups may be defined as G. For example, when a plurality of PDSCHs/PUSCHs are scheduled through M-DCI in a cell in which G is configured to 1, this may be referred to as a single PDSCH/PUSCH case. And, when a plurality of PDSCHs/PUSCHs are scheduled through M-DCI in a cell in which G is configured to a value greater than 1, this may be referred to as a multi-PDSCH/PUSCH case.

On the other hand, when a plurality of PDSCHs are scheduled in a plurality of time domains (e.g., slot domains) by M (multi)-DCI in consideration of 480/960 kHz SCS applicable to FR 2-2 band (or FR 3 band) (e.g. 52.6 GHz or higher, etc.), the absolute time for PDSCH transmission may be quite short. Since channel information related to a plurality of PDSCHs may not be significantly changed in a corresponding time domain, a plurality of PDSCH decoding results by the UE may be the same.

When the time bundling period is configured in consideration of the above-described situation, HARQ-ACK information/result for the PDSCH in the corresponding time bundling period may be bundled (e.g., logical AND operation is performed on HARQ-ACK information), and thus the HARQ-ACK payload may be reduced. Hereinafter, the time bundling method will be described in detail.

As method 1, time bundling may be performed based on the number of scheduled PDSCHs. For example, when M or less multi-PDSCHs are scheduled, the corresponding multi-PDSCHs may be bundled into one group. When more than M multi-PDSCHs are scheduled, the multi-PDSCHs may be divided into two groups and bundled.

In this case, the M value may be half of the maximum number of PDSCHs that may be scheduled by M-DCI configured in the corresponding cell (or all cells configured for the UE). When half of the maximum number of PDSCHs is not an integer, the M value may be an integer value obtained by applying a floor function, a ceiling function, or rounding to half of the maximum number of PDSCHs. However, this is only an embodiment, and the M value may be configured by higher layer signaling.

Specifically, when the number of PDSCHs that are actually scheduled is N (in this case, N>M), the first M PDSCHs may be bundled into group 1, and the remaining N-M PDSCHs may be bundled into group 2. As another example, the first ceil (N/2) PDSCHs may be bundled into group 1, and the remaining floor (N/2) PDSCHs may be bundled into group 2.

As method 2, time bundling may be performed based on the number of slots occupied by the PDSCH. For example, when L or less multi-PDSCHs are scheduled, the corresponding multi-PDSCHs may be bundled into one group. When more than L multi-PDSCHs are scheduled, the multi-PDSCHs may be divided into two groups and bundled.

In this case, the L value may be half of the maximum number of PDSCH slots that can be scheduled by M-DCI configured in the corresponding cell (or all cells configured for the UE). When half of the maximum number of PDSCHs is not an integer, the M value may be an integer value obtained by applying a floor function, a ceiling function, or rounding to half of the maximum number of PDSCHs. However, this is only an embodiment, and the L value may be configured by higher layer signaling.

Specifically, when the slot duration from the first slot of the actually scheduled first PDSCH to the slot of the last PDSCH consists of K (K>L) slots, PDSCHs in the first L slot durations may be bundled into group 1, and PDSCHs in the remaining K-L slot durations may be bundled into group 2. As another method, PDSCHs in the first ceil (K/2) slot durations may be bundled into group 1, and PDSCHs in the remaining floor (K/2) slot durations may be bundled into group 2.

As method 3, regardless of the number of PDSCHs and the number of slots, PDSCHs may be time-bundled into two groups. For example, when the number of actually scheduled PDSCHs is N, the first ceil (N/2) PDSCHs may be bundled into group 1, and the remaining floor (N/2) PDSCHs may be bundled into group 2.

Additionally or alternatively, G groups may be established. And, according to a scheduled (or valid) order, PDSCHs may be mapped to each group (e.g., in an ascending order of a group index).

As an example, when 5 PDSCHs are scheduled (or valid) and G is configured to 4, PDSCH #0/#4 may correspond (or map) to group #0, PDSCH #1 may correspond to group #1, PDSCH #2 may correspond to group #2, and PDSCH #3 may correspond to group #3. In this case, the valid PDSCH may mean a PDSCH that does not overlap with a symbol (or a slot including the corresponding symbol) configured as uplink (or flexible) by a parameter related to TDD UL/DL configuration (e.g., 'tdd-UL-DL-ConfigurationCommon' or/and 'tdd-UL-DL-ConfigurationDedicated').

An example in which the number of groups is 2 in Methods 1 to 3 is described. However, this is only an embodiment, and even when the number of groups exceeds 1 or 2, the operations/information according to Methods 1 to 3 may be applied.

Type-1 HARQ-ACK Codebook Configuration Method when Time Bundling is Configured

Among a plurality of PDSCHs scheduled by M-DCI, the K1 value may be applied based on the slot in which the last PDSCH is transmitted (on the time domain).

Here, the K1 value means a slot interval between the PDSCH transmission slot and the HARQ-ACK transmission slot for the corresponding PDSCH reception, and may be indicated by DCI.

That is, the HARQ-ACK timing (slot) may be determined by applying K1 based on the slot in which the last PDSCH is transmitted among a plurality of PDSCHs scheduled by M-DCI. In addition, HARQ-ACK feedback for all of the plurality of PDSCHs scheduled from M-DCI may be collectively transmitted at the corresponding HARQ-ACK timing (the same one).

Accordingly, HARQ-ACK feedback for all of the plurality of PDSCHs scheduled by M-DCIs (or/and S-DCIs indicating HARQ-ACK timing corresponding to the slot in which the PDSCH is transmitted) indicating (in the same slot) the HARQ-ACK timing corresponding to the slot in which the last PDSCH is transmitted may be multiplexed. And, all of the multiplexed HARQ-ACKs may be transmitted at the same single HARQ-ACK timing.

As an example, it is assumed that a set of a plurality of (e.g., K_N) K1 value candidates is configured. In the case of a type-1 HARQ-ACK codebook in a basic wireless communication system, by calculating the combination of all PDSCH occasions (SLIVs) transmittable in the previous DL slot (e.g., K1 DL slots) from the slot in which the HARQ-ACK corresponding to each K1 value (configured for each serving cell) is transmitted, occasions for candidate PDSCH receptions corresponding to each DL slot (including determination of the position/order of the HARQ-ACK bit corresponding to each SLIV) may be configured (i.e., SLIV pruning).

Here, SLIV is an indication value for a start symbol index and the number of symbols in a slot of the PDSCH and/or PUSCH. It may be configured as a component of an entry constituting a TDRA field in a PDCCH for scheduling the corresponding PDSCH and/or PUSCH.

A HARQ-ACK information bit may be configured for each occasion included in the set of occasions for candidate PDSCH receptions. As the HARQ-ACK information is concatenated as shown in Table 6 below, the entire HARQ-ACK codebook may be configured.

TABLE 6

A UE determines $\tilde{o}_0^{ACK}, \tilde{o}_1^{ACK}, \ldots, \tilde{o}_{o_{ACK}^{ACK}-1}^{ACK}$ HARQ-ACK information bits, for a total number of $O_{ACK}$ HARQ-ACK information bits, of a HARQ-ACK codebook for transmission in a PUCCH according to the following pseudo-code. In the following pseudo-code, if the UE does not receive a transport block or a CBG, due to the UE not detecting a corresponding DCI format, the UE generates a NACK value for the transport block or the CBG. The cardinality of the set $M_{A,c}$ defines a total number $M_c$ of occasions for PDSCH reception or SPS PDSCH release for serving cell c corresponding to the HARQ-ACK information bits.
Set c = 0 - serving cell index: lower indexes correspond to lower RRC indexes of corresponding cells including, when applicable, cells in the set $S_0$ and the set $S_1$
Set j = 0 - HARQ-ACK information bit index
Set $N_{cells}^{DL}$ to the number of serving cells configured by higher layers for the UE
while c < $N_{cells}^{DL}$
Set m = 0 - index of occasion for candidate PDSCH reception or SPS PDSCH release
while m < $M_c$
if harq-ACK-SpatialBundlingPUCCH is not provided, PDSCH-CodeBlockGroupTransmission is not provided, and the UE is configured by maxNrofCode WordsScheduledByDCI with reception of two transport blocks for the active DL BWP of serving cell c,
$\tilde{o}_j^{ACK}$ = HARQ-ACK information bit corresponding to a first transport block of this cell;
j = j + 1.
$\tilde{o}_j^{ACK}$ = HARQ-ACK information bit corresponding to a second transport block of this cell;
j = j+1.

TABLE 6-continued elseif harq-ACK-SpatialBundlingPUCCH is provided, and the UE is configured by
maxNrofCode WordsScheduledByDCI with reception of two transport blocks for the active
DL BWP of serving cell c,
$\tilde{o}_j^{ACK}$ = binary AND operation of the HARQ-ACK information bits corresponding to first and
second transport blocks of this cell - if the UE receives one transport block, the UE assumes
ACK for the second transport block;
j = j + 1.
elseif PDSCH-CodeBlockGroupTransmission is provided, and $N_{HARQ-ACK,c}^{CBG/TB,max}$ CBGs are
indicated by maxCodeBlockGroupsPerTransportBlock for serving cell c,
Set $n_{CBG}$ = 0 - CBG index
while $n_{CBG}$ < $N_{HARQ-ACK,c}^{CBG/TB,max}$
$\tilde{o}_j^{ACK}$ = HARQ-ACK information bit corresponding to CBG $n_{CBG}$ of the first transport block;
if the UE is configured by maxNrofCode WordsScheduledByDCI with reception of two
transport blocks for the active DL BWP of serving cell c $\tilde{o}_{j+n_{CBG}+N_{HARQ-ACK,c}^{CBG/TBmax}}^{ACK}$ = HARQ-ACK information bit corresponding to CBG $n_{CBG}$ of the second transport block;
end if
$n_{CBG}$ = $n_{CBG}$ +1;
end while
j = j + $N_{HARQ-ACK,c}^{CBG/TB,max}$, where $N_{TB,c}^{DL}$ is the value of maxNrofCode WordsScheduledByDCI
for the active DL BWP of serving cell c;
else
$\tilde{o}_j^{ACK}$ = HARQ-ACK information bit of serving cell c ;
j = j + 1.
end if
m = m + 1.
end while
c = c + 1.
end while Hereinafter, a method of configuring the type-1 HARQ-ACK codebook in the case where time bundling is configured will be described.

First, SLIV pruning may be performed based on the last SLIVs (in each row of the TDRA table). For each DL slot corresponding to K1, if G groups are required for any of the TDRA row indexes corresponding to K1 after SLIV pruning, the number of occasions as much as (G-1) may be added to the SLIV pruning result.

For example, a TDRA entry for M-DCI in a specific cell may include a row index #0 and a row index #1. In this case, in the case of row index #0, five SLIV values may be linked, and the last SLIV may be configured as {S=0,L=5}. And, in the case of row index #1, three SLIV values are linked, and the last SLIV may be configured as {S=2,L=5}. Here, S may represent a start symbol, and L may represent a symbol length.

In addition, the TDRA entry for S-DCI in the corresponding cell may include row index #0, and the SLIV corresponding to row index #0 may consist of {S=9, L=5}.

When SLIV pruning is performed using only the last SLIVs for a specific DL slot corresponding to a specific K1 for a corresponding cell, two occasions for receiving a candidate PDSCH may be allocated to the corresponding DL slot.

When two groups are configured and M is configured to 4 as in method 1 above, since both groups are required for at least row index #0, the number of occasions for candidate PDSCH receptions may be three in the final corresponding DL slot.

For example, when row index #0 or row index #1 is scheduled by M-DCI, HARQ-ACK information related to row index #0 or row index #1 may correspond to the first two occasions among the plurality of occasions.

Here, in the case of row index #1, since there is no PDSCH corresponding to the second group, the second occasion may be filled with NACK. And when row index #0 is scheduled by S-DCI, HARQ-ACK information (corresponding to S-DCI) may correspond to the third occasion.

As another example, the TDRA entry for M-DCI in a specific cell may include row index #0 and row index #1. In this case, in the case of row index #0, five SLIV values may be linked, and the last SLIV may be configured as {S=9, L=5}. And, in the case of row index #1, three SLIV values are linked, and the last SLIV may be configured as {S=10, L=4}.

In addition, the TDRA entry for S-DCI in the corresponding cell may include row index #0, and the SLIV corresponding to row index #0 may consist of {S=0, L=5}.

When SLIV pruning is performed using only the last SLIVs for a specific DL slot corresponding to a specific K1 for a corresponding cell, two occasions for candidate PDSCH receptions may be allocated to the corresponding DL slot.

When two groups are configured and M is configured to 4 as in the above-described method 1, since both groups are required for at least row index #0, the number of occasions for candidate PDSCH receptions may be 3 in the corresponding DL slot.

When row index #0 or row index #1 is scheduled by M-DCI, HARQ-ACK information related to row index #0 or row index #1 may correspond to the first and third occasions among a plurality of occasions.

In this case, in the case of row index #1, since there is no PDSCH corresponding to the second group, the third occasion may be filled with NACK. And, when row index #0 is scheduled by S-DCI, HARQ-ACK information related to row index #0 may correspond to the second occasion.

That is, when SLIV pruning is performed using only the last SLIVs, an occasion may be allocated to row index #0 corresponding to S-DCI first. And, since the next occasion is allocated to row index #0/1 corresponding to M-DCI, a total of two occasions may be configured/allocated. Additionally, since the occasion according to time bundling is configured before the corresponding two occasions, a total of three occasions may be allocated to the corresponding DL slot.

SPS PDSCH Activation and SPS PDSCH Release Method Through M-DCI

In the NR system, activation for a semi-persistent scheduling (SPS) PDSCH may be performed in the manner shown in Table 7 below.

TABLE 7

| 10.2 PDCCH validation for DL SPS and UL grant Type 2 |
|---|
| A UE validates, for scheduling activation or scheduling release, a DL SPS assignment PDCCH or a configured UL grant Type 2 PDCCH if the CRC of a corresponding DCI format is scrambled with a CS-RNTI provided by cs-RNTI, and the new data indicator field in the DCI format for the enabled transport block is set to '0', and the DFI flag field, if present, in the DCI format is set to '0', and if validation is for scheduling activation and if the PDSCH-to-HARQ_feedback timing indicator field in the DCI format is present, the PDSCH-to-HARQ_feedback timing indicator field does not provide an inapplicable value from dl-DataToUL-ACK-r16. If a UE is provided a single configuration for UL grant Type 2 PUSCH or for SPS PDSCH, validation of the DCI format is achieved if all fields for the DCI format are set according to Table 10.2-1 or Table 10.2-2. (e.g., in Table 10.2-1, "Special fields for single DL SPS or single UL grant Type 2 scheduling activation PDCCH validation when a UE is provided a single SPS PDSCH or UL grant Type 2 configuration in the active DL/UL BWP of the scheduled cell", regarding 'DCI format 1_1', for the enabled transport block, Redundancy version set to all '0's.) If a UE is provided more than one configurations for UL grant Type 2 PUSCH or for SPS PDSCH, a value of the HARQ process number field in a DCI format indicates an activation for a corresponding UL grant Type 2 PUSCH or for a SPS PDSCH configuration with a same value as provided by ConfiguredGrantConfigIndex or by sps-ConfigIndex, respectively. Validation of the DCI format is achieved if the RV field for the DCI format is set as in Table 10.2-3. If a UE is provided more than one configuration for UL grant Type 2 PUSCH or for SPS PDSCH if the UE is provided ConfiguredGrantConfigType2DeactivationStateList or sps-ConfigDeactivationStateList, a value of the HARQ process number field in a DCI format indicates a corresponding entry for scheduling release of one or more UL grant Type 2 PUSCH or SPS PDSCH configurations if the UE is not provided ConfiguredGrantConfigType2DeactivationStateList or sps-ConfigDeactivationStateList, a value of the HARQ process number field in a DCI format indicates a release for a corresponding UL grant Type 2 PUSCH or for a SPS PDSCH configuration with a same value as provided by ConfiguredGrantConfigIndex or by sps-ConfigIndex, respectively Validation of the DCI format is achieved if all fields for the DCI format are set according to Table 10.2-4. If validation is achieved, the UE considers the information in the DCI format as a valid activation or valid release of DL SPS or configured UL grant Type 2. If validation is not achieved, the UE discards all the information in the DCI format. A UE is expected to provide HARQ-ACK information in response to a SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N = 5 for μ = 0, N = 5.5 for μ = 1, and N = 11 for μ = 2, otherwise, N = 10 for μ = 0, N = 12 for μ = 1, N = 22 for μ = 2, and N = 25 for μ = 3, wherein u corresponds to the smallest SCS configuration between the SCS configuration of the PDCCH providing the SPS PDSCH release and the SCS configuration of a PUCCH carrying the HARQ-ACK information in response to a SPS PDSCH release. |

In this regard, the resource location in the slot of the SPS configuration activated by the SLIV value indicated in the TDRA field on the corresponding SPS PDSCH activation DCI may be determined. However, when performing SPS PDSCH activation through M-DCI, since a plurality of SLIVs may be linked to a specific row index indicated through the TDRA field on the M-DCI, determination of a resource location in a slot of the SPS PDSCH may become ambiguous.

In order to solve this problem, the following methods may be considered.

In one method, when at least one row index among the TDRA row indexes configured in M-DCI is linked with only a single SLIV, it may be configured/prescribed to allow SPS activation through the corresponding M-DCI. In this case, when SPS is actually activated through the corresponding M-DCI, the UE may expect that the TDRA row index linked with only a single SLIV is indicated through the corresponding M-DCI.

If the method is applied, even if the SPS PDSCH activation DCI is indicated through M-DCI, by applying the constraint that the corresponding DCI schedules only one resource for one PDSCH, ambiguity about the SPS PDSCH resource of the UE may be eliminated, and the UE implementation complexity may be reduced.

Alternatively, even if all TDRA row indices configured in M-DCI are linked with multiple SLIVs or some TDRA row indices configured in M-DCI are linked with multiple SLIVs, when SPS is activated through the corresponding M-DCI, it may be allowed to indicate a TDRA row index in which a plurality of SLIVs are linked.

In this case, the UE may consider only a specific SLIV (e.g., first SLIV, last SLIV, etc.) among a plurality of SLIVs linked to the indicated TDRA row index as valid. In the case of this method, the UE may determine the location of the time resource of the SPS PDSCH based on the specific SLIV information, and may determine the location of the HARQ-ACK bit when configuring the HARQ-ACK timing and the HARQ-ACK codebook.

For example, if {slot n+1, SLIV #1} and {slot n+2, SLIV #2} are configured by the TDRA row index indicated in the SPS-activated M-DCI transmitted in slot n, the SPS PDSCH may be activated based on the last SLIV {slot n+2, SLIV #2}. In this case, SLIV #2 of slot n+2 may be the first time resource allocated for the SPS PDSCH. Accordingly, when configuring the HARQ-ACK codebook (especially when configuring the type-1 HARQ-ACK codebook), the UE may transmit ACK/NACK information for the SPS PDSCH to the HARQ-ACK bit location corresponding to the corresponding SLIV.

The above-described problem may also occur in uplink configured grant (CG) PUSCH type 2.

That is, the resource location in the slot of the activated CG configuration may be determined by the SLIV value indicated by the TDRA field on the corresponding CG PUSCH activation DCI. However, when CG PUSCH activation is performed through M-DCI, since a plurality of SLIVs may be linked to a specific row index indicated through the TDRA field on the M-DCI, determination of a resource location in a slot of the CG PUSCH may become ambiguous.

In order to solve this problem, the following methods may be considered.

In one method, when at least one row index among the TDRA row indexes configured in M-DCI is linked with only a single SLIV, it may be configured/prescribed to allow CG activation through the corresponding M-DCI. In this case, when CG is actually activated through the corresponding M-DCI, the UE may expect that the TDRA row index linked with only a single SLIV is indicated through the corresponding M-DCI.

If the method is applied, even if CG PUSCH activation DCI is indicated through M-DCI, by applying the constraint that the corresponding DCI schedules only one resource for one PUSCH, ambiguity of the CG PUSCH resource of the UE may be eliminated, the UE implementation complexity may be reduced.

Alternatively, even if all TDRA row indices configured in M-DCI are linked with multiple SLIVs or some TDRA row indices configured in M-DCI are linked with multiple SLIVs, when CG is activated through the corresponding M-DCI, it may be allowed to indicate a TDRA row index in which a plurality of SLIVs are linked. In this case, the UE may consider only a specific SLIV (e.g., the first SLIV and the last SLIV) among a plurality of SLIVs linked to the indicated TDRA row index as valid. The UE may determine the time resource location of the CG PUSCH based on the specific SLIV information.

In particular, in the case of the SPS PDSCH, a method in which only the last SLIV among a plurality of SLIVs linked to a TDRA row index indicated through SPS activation M-DCI is considered valid may be considered. Also, in the case of the CG PUSCH, a method in which only the first SLIV is considered valid among a plurality of SLIVs linked to a TDRA row index indicated through CG activation M-DCI may be considered.

Referring to Table 7 above, when DL SPS is activated through DCI format 1_1, there is a condition that all RV (redundancy version) values corresponding to enabled transport block (TB) should be configured to 0. However, a rule may be required even when a TDRA row index in which a plurality of SLIVs are linked may be indicated through the corresponding DCI format 1_1.

For example, the condition in Table 7 described above may be replaced with a condition in which all RV values corresponding to the enabled TB of the PDSCH scheduled through a specific SLIV (e.g., first SLIV, last SLIV) value among a plurality of SLIVs must be configured to 0. Here, the specific SLIV may be configured based on invalid SLIV(s) among a plurality of SLIVs.

Alternatively, as another example, the condition in Table 7 described above may be replaced with a condition in which all RV values corresponding to enabled TBs of PDSCH scheduled through all SLIV values among a plurality of SLIVs must be configured to 0. Here, all SLIVs may be configured based on invalid SLIV(s) among a plurality of SLIVs.

In addition, in the NR system, deactivation or release of the SPS PDSCH may be performed in the manner shown in Table 7 above.

In this regard, the HARQ-ACK bit location may be determined when configuring the HARQ-ACK timing and/or the HARQ-ACK codebook by the SLIV value indicated by the TDRA field on the corresponding SPS PDSCH deactivation DCI.

However, when performing SPS PDSCH release through M-DCI, since a plurality of SLIVs may be linked to a specific row index indicated through the TDRA field on the M-DCI, the HARQ-ACK timing and/or the HARQ-ACK codebook configuration may become ambiguous.

In order to solve this problem, the following methods may be considered.

As one method, when at least one row index among the TDRA row indexes configured in the M-DCI is linked with only a single SLIV, SPS deactivation through the corresponding M-DCI may be configured/prescribed to be allowed. In this case, when actually deactivating the SPS through the corresponding M-DCI, the UE may expect that the TDRA row index linked with only a single SLIV is indicated through the corresponding M-DCI.

If the method is applied, even if SPS PDSCH deactivation DCI is indicated through M-DCI, by applying the constraint that the corresponding DCI schedules only one resource for one PDSCH, ambiguity about the SPS PDSCH resource of the UE may be eliminated, and the UE implementation complexity may be reduced.

Alternatively, even if all TDRA row indices configured in M-DCI are linked with multiple SLIVs or some TDRA row indices configured in M-DCI are linked with multiple SLIVs, when deactivation of SPS through the corresponding M-DCI, it may be allowed to indicate a TDRA row index in which a plurality of SLIVs are linked. In this case, the UE may consider only a specific SLIV (e.g., the first SLIV and the last SLIV) among a plurality of SLIVs linked to the indicated TDRA row index as valid. In the case of the method, the UE may determine the HARQ-ACK bit location when configuring the HARQ-ACK timing and/or the HARQ-ACK codebook based on the specific SLIV information.

For example, if {slot n+1, SLIV #1} and {slot n+2, SLIV #2} are configured by the TDRA row index indicated in the SPS deactivation M-DCI transmitted in slot n, the SPS PDSCH may be deactivated based on the last SLIV {slot n+2, SLIV #2}. At this time, based on slot n+2, the HARQ-ACK timing corresponding to the SPS PDSCH may be determined, and when configuring the HARQ-ACK codebook (in particular, when configuring the type-1 HARQ-ACK codebook), the UE may transmit ACK/NACK information for the SPS PDSCH at the HARQ-ACK bit location corresponding to the corresponding SLIV.

Type-2 HARQ-ACK Codebook (HCB) Configuration Method According to Enable/Disable of HARQ Operation Specifically, when enabling/disabling HARQ operation (including HARQ-ACK feedback operation) for all or some HARQ process numbers (HPNs) may be configured by higher layer signaling (or when it may be dynamically indicated through DCI), the present disclosure describes a method of configuring a type-2 HCB. In this embodiment, the type-2 HCB may include an enhanced type-2 HCB.

In one embodiment, hereinafter, a method of configuring a type-2 HCB in a case where the number of HPNs for which HARQ operation is enabled is 1 (or 0) and the number of HPNs disabled is K-1 (or K) among all K HPNs (configured) for a specific cell will be described.

For example, when counting DAI by DCI, since the effective HARQ-ACK bit corresponding to each DCI may be up to 1 bit (however, up to 2 bits when 2-TB is enabled) even in the multi-PDSCH case, a single codebook (CB) may be configured for a single-PDSCH case and a multi-PDSCH case corresponding to a corresponding cell.

Here, configuring a single CB may mean a structure in which a C-DAI/T-DAI value is counted and signaled in consideration of a single-PDSCH case and a multi-PDSCH case together. That is, in configuring a single CB, the order and/or total of the DCI/PDSCH scheduled without distinction for each case may be determined/signaled.

In particular, when the number of HPNs in which the HARQ operation is enabled for each of all cell(s) in which multi-PDSCH DCI is configured in the same PUCCH cell group is 1 or less, (if CBG is not configured) a single CB may be configured by counting the DAI values together (commonly) for the single-PDSCH case and the multi-PDSCH case within the corresponding PUCCH cell group.

At this time, not independently counting the DAI for the single-PDSCH case and the multi-PDSCH case, and not configuring an individual sub-CB may be performed in parallel. In addition, in this case, through the UL grant DCI, individual DAI field/information may not be configured/indicated for the single-PDSCH case and the multi-PDSCH case, and only one common DAI field/information may be configured/indicated.

Additionally or alternatively, hereinafter, a method of configuring a type-2 HCB in the case where the number of HPNs for which HARQ operation is enabled is N (N>1) and the number of HPNs disabled is K-N among all K HPNs configured for a specific cell in which multi-PDSCH DCI is configured will be described.

Alternatively, a method of configuring a type-2 HCB in the case where the number of HPNs for which HARQ operation is enabled is N and the number of HPNs disabled is K-N among all K HPNs configured for at least one cell among multiple cells in which multi-PDSCH DCI is configured in the PUCCH cell group will be described.

For example, when counting DAI for each DCI, one sub-CB corresponding to the single-PDSCH case (referred to as the first sub-CB) may be configured and another sub-CB corresponding to the multi-PDSCH case (referred to as the second sub-CB) may be configured. Here, configuring the individual sub-CBs may mean a structure in which C-DAI/T-DAI values are independently determined and signaled for each sub-CB. That is, the order and/or the total of DCI/PDSCH scheduled for each sub-CB may be independently determined/signaled.

According to the above example, when the number of enabled HPNs among HPNs scheduled through M-DCI (or S-DCI) is one or less, the UE may map the HARQ-ACK bit(s) corresponding to the DCI to the first sub-CB. In addition, when the number of enabled HPNs among HPNs scheduled through M-DCI (or S-DCI) is two or more, the UE may map the HARQ-ACK bit(s) corresponding to the DCI to the second sub-CB.

In this case, for the second sub-CB, the number of HARQ-ACK bits corresponding to one DAI value may be calculated based on max_XY or min (max_HPN_total, max_XY_total) values.

Here, the max_HPN_total value may mean a maximum value among the number of enabled HPNs configured in each of a plurality of cells in which multi-PDSCH DCI is configured in the same PUCCH cell group. For example, when cell #1 and cell #2 belong to the same PUCCH cell group, and multi-PDSCH scheduling DCI is configured for both cells, if the number of HPNs for which the HARQ operation is enabled for cell #1 is 3 and the number of HPNs for which the HARQ operation is enabled for cell #2 is 4, the max_HPN_total may be 4.

As another example, when 2 TB is configured for cell #1, spatial bundling is not configured, and 2 TB is not configured for cell #2, max_HPN_total may be 6. Here, the max_HPN_total of 6 may mean that, considering 2 bits for each PDSCH for cell #1, the maximum value of 6 among 6 bits for cell #1 and 4 bits for cell #2 is configured as max_HPN_total.

In addition, the max_XY_total value may be defined as the maximum X*Y value among arbitrary cells (in one cell group) when M-DCI is configured for a plurality of cells. Here, Y is the maximum number of PDSCHs that can be scheduled by M-DCI, and X may be calculated as 1 for a cell in which 2 TB is configured but spatial bundling is configured or 1 TB is configured.

Additionally or alternatively, based on the max_HPN and max_XY values for each one cell, Z=min (max_HPN, max_XY) may be determined for each cell, and the number of HARQ-ACK bits corresponding to one DAI value may be calculated based on the maximum value among Z values of each cell.

As described above, when the number of HARQ-ACK bits corresponding to one DAI value is calculated based on max_XY or min (max_HPN_total, max_XY_total) values, a method of mapping the HARQ-ACK bit(s) corresponding to the enabled HPN in the HARQ-ACK payload corresponding to one DAI value to the lowest (or highest) bit index(s) may be applied. In addition, for HARQ-ACK bits corresponding to the enabled HPN, a method of mapping a bit having a lower (or higher) HARQ ID to a lower (or higher) bit index or mapping a bit having an earlier corresponding PDSCH reception time to a lower (or higher) bit index may be applied.

In addition, with respect to the method described in this embodiment, one HPN value is indicated through M-DCI, and the indicated HPN value increases by 1 from the first PDSCH and may be mapped to each PDSCH. In this case, if necessary, modulo operation may be applied in relation to PDSCH mapping. Here, the corresponding PDSCH may be limited to a valid PDSCH, and the valid PDSCH may mean a PDSCH that does not overlap with UL symbol(s) configured by higher layer signaling (e.g., tdd-UL-DL-ConfigurationCommon or tdd-UL-DL-ConfigurationDedicated).

A Method for Scheduling a Plurality of PXSCHs in a Multi-PXSCH Case and a Method for Configuring a HARQ-ACK Codebook Corresponding to M-DCI Hereinafter, a scheduling method for a plurality of PXSCHs in a multi-PXSCH (e.g., PDSCH/PUSCH) case and a method for configuring a HARQ-ACK codebook corresponding to M-DCI will be described.

In a wireless communication system, the mmWave band (e.g., 7.125 or 24.25 GHZ or more, up to 52.6 GHz) may be defined as a frequency range (FR) 2 (or FR2-1). The subcarrier spacing (SCS) of the SS/PBCH block in the corresponding band may be either 120 or 240 kHz, and the SCS of other signals/channels (e.g., PDCCH, PDSCH, PUSCH, etc.) is either 60 or 120 kHz.

Larger SCSs may be used in a band (e.g., 52.6 GHz or more, up to 71 GHZ) of a high frequency wireless communication system (FR 2-2). When the scalability of the OFDM symbol duration and CP length defined in the current wireless communication system is maintained, OFDM symbol duration and CP length for each SCS may be defined as shown in Table 8 below.

TABLE 8

| SCS [kHz] | 120 | 240 | 480 | 960 |
|---|---|---|---|---|
| Symbol duration | 8.33 us | 4.17 us | 2.08 us | 1.04 us |
| CP Length | 586 ns | 293 ns | 146 ns | 73 ns |

In consideration of the monitoring capability of the UE in the FR2-2 frequency band, PDCCH monitoring may be performed in one slot in units of a plurality of slots. Due to this, in consideration of the reduced PDCCH monitoring occasion area, a plurality of PDSCHs may be scheduled through one DCI. However, the PDSCH indicated/scheduled through the corresponding DCI may be indicated/scheduled to be transmitted not only in the FR2-2 band but also in other FR bands.

That is, the M-DCI described in the present disclosure is not limited to the wireless communication system operating in FR2-2, but may be extended and applied to the wireless communication system operating in another frequency band.

Figure 10:
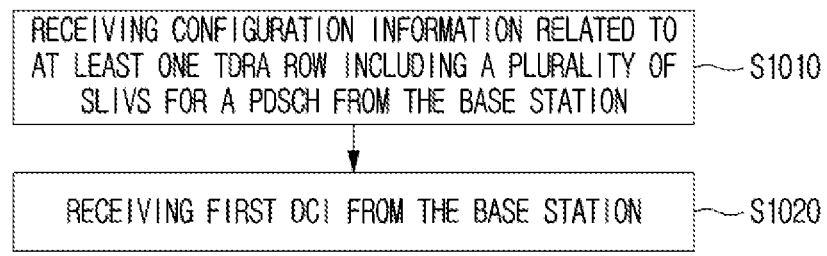
FIG. 10 is a diagram for describing a method for a UE to perform communication in a wireless communication system to which the present disclosure may be applied.

FIG. 10 is a diagram for describing downlink reception and uplink transmission operations of a UE in a wireless communication system to which the present disclosure may be applied.

The UE may receive configuration information related to at least one TDRA row including a plurality of SLIVs for the PDSCH from the base station S1010.

Specifically, the UE may receive the configuration information related to the at least one TDRA row on the downlink BWP of a serving cell through higher layer signaling.

For example, the configuration information related to the at least one TDRA row may be transmitted from the base station to the UE through RRC signaling (e.g., 'pdsch-TimeDomainAllocationListForMultiPDSCH').

The UE may receive first downlink control information (DCI) from the base station S1020.

In this case, the first DCI may include indication information of a transmission configuration indicator (TCI) state and may not include downlink (DL) assignment information.

Here, the DL assignment information may include information for scheduling the PDSCH. In addition, the indication information of the TCI state may include information for updating at least one DL reference signal (RS) having a quasi-co-location (QCL) relationship.

In addition, the number of SLIVs in a specific TDRA row indicated by the first DCI among at least one TDRA row may be 1. That is, the UE may expect that the number of SLIVs in a specific TDRA row indicated by the first DCI does not exceed 1.

The UE may transmit a HARQ-ACK codebook including first hybrid automatic repeat request (HARQ)-acknowledgement (ACK) information for the TCI state indication to the base station.

Here, the location of the HARQ-ACK information on the HARQ-ACK codebook may be the same as the location of the HARQ-ACK information for the PDSCH reception when the PDSCH reception with the at least one decoded CBG (code block group) or at least one transport block is scheduled by the first DCI.

As another example of the present disclosure, the UE may receive, from the base station, the second DCI including information indicating secondary cell (SCell) dormancy and not including information for scheduling the PDSCH.

In this case, the UE may transmit HARQ-ACK information for the second DCI to the base station. And, the HARQ-ACK information value may include ACK.

Figure 11:
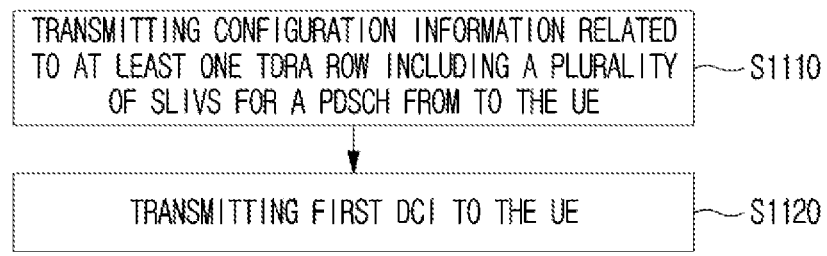
FIG. 11 is a diagram for describing a method for a base station to perform communication in a wireless communication system to which the present disclosure may be applied.

FIG. 11 is a diagram for describing downlink transmission and uplink reception operations of a base station in a wireless communication system to which the present disclosure may be applied.

The base station may transmit configuration information related to at least one TDRA row including a plurality of SLIVs for the PDSCH to the UE S1110.

The base station may transmit the first DCI to the UE S1120. In this case, the first DCI may include indication information of the TCI state and may not include DL assignment information. In addition, the number of SLIVs in a specific TDRA row indicated by the first DCI among at least one TDRA row may be 1.

Operations and parameters related to S1110 and S1120 may correspond to operations and parameters related to S1010 and S1020, and thus redundant descriptions will be omitted.

Hereinafter, a scheduling method for a plurality of PXSCHs in a multi-PXSCH case and a method for configuring a HARQ-ACK codebook corresponding to M-DCI will be described in more detail.

Embodiment 1

Embodiment 1 describes a method of configuring a type-1 HARQ-ACK codebook when time domain bundling is configured.

When time domain bundling is configured for a cell in which M-DCI (for PDSCH) is configured (that is, when 'enableTimeDomainHARQ-Bundling', which is a higher layer parameter, is configured), the UE may configure the Type-1 HARQ-ACK codebook according to Tables 9 and 10.

TABLE 9

Type-1 HARQ-ACK codebook in physical uplink control channel
If enableTimeDomainHARQ-Bundling is provided
set $R_T' = R$
set $R_T$ to the set of row indexes that include the last SLIV of each row of set $R_T'$
If the set of rows R includes a row with more than one entry as described in [6, TS 38.214]
and enableTimeDomainHARQ-Bundling is not provided, the set of rows R and the set of slot
timing values $K_1$ are updated in this clause according to the following pseudo-code.

TABLE 9-continued

If a UE is not provided ca-SlotOffset for any serving cell of PDSCH receptions and for the
serving cell of corresponding PUCCH transmission with HARQ-ACK information
while k < C(K$_1$)
if mod (n$_U$ − K$_{1, k}$ + 1, max($2^{\mu UL-\mu DL}$, 1)) = 0 or subslotLengthForPUCCH is provided for
the HARQ-ACK codebook
Set n$_D$ = 0 − index of a DL slot overlapping with an UL slot
Set N$_k$ to a number of DL slots overlapping with UL slot n$_U$ − K$_{1, k}$ if
subslotLengthForPUCCH is provided for the HARQ-ACK codebook; otherwise, N$_k$ =
max($2^{\mu UL-\mu DL}$, 1)
while n$_D$ < N$_k$
if PDSCH-TimeDomainResourceAllocationListForMultiPDSCH and
enableTimeDomainHARQ-Bundling are provided for serving cell c
R = RT;
R' = R$_T$';

TABLE 10

A UE determines $\tilde{o}_0^{ACK}, \tilde{o}_1^{ACK}, \ldots, \tilde{o}_{O_{ACK}-1}^{ACK}$ HARQ-ACK information bits, for a total number
of $O_{ACK}$ HARQ-ACK information bits, of a HARQ-ACK codebook for transmission in a
PUCCH according to the following pseudo-code. In the following pseudo-code, if the UE
does not receive a transport block or a CBG, due to the UE not detecting a corresponding
DCI format, the UE generates a NACK value for the transport block or the CBG. The
cardinality of the set M$_{A,c}$ defines a total number M$_c$ of occasions for PDSCH reception or
SPS PDSCH release or TCI state update for serving cell c corresponding to the HARQ-ACK
information bits.
Set c = 0 - serving cell index: lower indexes correspond to lower RRC indexes of
corresponding cells including, when applicable, cells in the set S$_0$ and the set S$_1$
Set j = 0 - HARQ-ACK information bit index
Set N$_{cells}^{DL}$ to the number of serving cells configured by higher layers for the UE
while c < N$_{cells}^{DL}$
Set m = 0 - index of occasion for candidate PDSCH reception, or SPS PDSCH release, or
TCI state update
while m < M$_c$
if enableTimeDomainHARQ-Bundling is provided for serving cell c and a PDSCH
associated with occasion m is scheduled by a DCI format indicating a TDRA row that
includes more than one SLIV entry
if harq-ACK-SpatialBundlingPUCCH is not provided and the UE is configured by
maxNrofCodeWordsScheduledByDCI with reception of two transport blocks for the active
DL BWP of serving cell c
if the PDSCH is associated with the last SLIV in the TDRA row
$\tilde{o}_j^{ACK}$ = binary AND operation of the HARQ-ACK information bits corresponding to first
transport blocks in PDSCH receptions, that do not overlap with an uplink symbol indicated
by tdd-UL-DL-ConfigurationCommon or tdd-UL-DL-ConfigurationDedicated, scheduled
by the DCI format on serving cell c;
j = j + 1;
$\tilde{o}_j^{ACK}$ = binary AND operation of the HARQ-ACK information bits corresponding to second
transport blocks in PDSCH receptions, that do not overlap with an uplink symbol indicated
by tdd-UL-DL-ConfigurationCommon or tdd-UL-DL-ConfigurationDedicated, scheduled
by the DCI format on serving cell c;
else
$\tilde{o}_j^{ACK}$ = NACK;
j = j + 1;
$\tilde{o}_j^{ACK}$ = NACK;
end if
j = j + 1;
elseif harq-ACK-SpatialBundlingPUCCH is provided and the UE is configured by
maxNrofCodeWordsScheduledByDCI with reception of two transport blocks for the active
DL BWP of serving cell c
if the PDSCH is associated with the last SLIV in the TDRA row;
$\tilde{o}_j^{ACK}$ = binary AND operation of the HARQ-ACK information bits corresponding to all
transport blocks in PDSCHs, that do not overlap with an uplink symbol indicated by tdd-UL-
DL-ConfigurationCommon or tdd-UL-DL-ConfigurationDedicated, scheduled by the DCI
format of serving cell c
if the UE receives one transport block, the UE assumes ACK for the second transport block;
else
$\tilde{o}_j^{ACK}$ = NACK;
end if
j = j + 1;
else
if the PDSCH is associated with the last SLIV in the TDRA row;
$\tilde{o}_j^{ACK}$ = binary AND operation of the HARQ-ACK information bits corresponding to all
transport blocks in PDSCHs, that do not overlap with an uplink symbol indicated by tdd-UL-
DL-ConfigurationCommon or tdd-UL-DL-ConfigurationDedicated, scheduled by the DCI
format of serving cell c TABLE 10-continued

```
else
  õ_j^{ACK} = NACK;
  end if
  j = j + 1;
end if
```

Specifically, Table 9 shows a method of determining a candidate PDSCH reception occasion based on a specific SLIV of each TDRA table index. When there are a plurality of SLIVs corresponding to a specific TDRA table index, the last SLIV may be determined as the specific SLIV.

In addition, Table 10 shows a method of mapping HARQ-ACK information corresponding to the determined candidate PDSCH reception occasion. When one scheduled PDSCH corresponds to a specific PDSCH reception occasion and the corresponding PDSCH corresponds to the last SLIV, bundled HARQ-ACK information may be mapped. Conversely, when the corresponding PDSCH does not correspond to the last SLIV, NACK may be mapped.

As another example, for a cell in which time domain bundling is configured and M-DCI (for PDSCH) is configured as shown in Table 9, one index on the TDRA table that can be scheduled by the corresponding M-DCI may schedule three consecutive slots. And, the SLIV for each slot may be configured identically.

Additionally or alternatively, it is assumed that the K1 values configured for the corresponding cell are 2 and 3. According to Table 9, the type-1 HARQ-ACK codebook configuration for the PUCCH to be transmitted in slot #N may be determined by the K1 value. For example, if the K1 value is 3, SLIV0 in slot #N-3 (which is the last SLIV) may be determined as the first PDSCH reception occasion, and if the K1 value is 2, SLIV0 in slot #N-2 (which is the last SLIV) may be determined as the second PDSCH reception occasion.

As three consecutive PDSCHs are scheduled (by M-DCI) on slot #N-4/N-3/N-2 and the UE is instructed to set the K1 value to 2, HARQ-ACK feedback for the three PDSCHs may be transmitted on slot #N PUCCH.

Hereinafter, as shown in Table 10, a method of mapping HARQ-ACK information for each PDSCH reception occasion will be described. Since the PDSCH of slot #N-4 scheduled by the corresponding DCI does not correspond to the PDSCH reception occasion determined by the method according to Table 9, the UE may not generate the corresponding HARQ-ACK information.

And, since the PDSCH of slot #N-3 scheduled by the corresponding DCI corresponds to the first PDSCH reception occasion determined by the method according to Table 9, the corresponding HARQ-ACK bit may be generated. However, since the corresponding PDSCH does not correspond to the last SLIV, the UE maps NACK information. That is, since slots #N-5/N-4/N-3 having slot #N-3 as the last SLIV cannot be scheduled at the same time, the UE may map NACK information.

And, since the PDSCH of slot #N-2 scheduled by the corresponding DCI corresponds to the second PDSCH reception occasion determined by the method according to Table 9, the HARQ-ACK bit may be generated. Since the corresponding PDSCH corresponds to the last SLIV, the UE may bundle (i.e., by performing a logical AND operation) and map HARQ-ACK information of three PDSCHs received in slot #N-4/N-3/N-2.

The above-described operation assumes that the number of PDSCHs that can be scheduled for a specific PDSCH reception occasion is not plural. For example, as shown in FIG. 9(a), it may be assumed that two PDSCHs cannot be overlapped with SLIV0 in slot #N-3 through different DCIs.

However, it is assumed that some slot/symbol(s) that can be scheduled by M-DCI overlap with semi-static UL symbols (i.e., higher layer signaling (e.g., UL symbol set by 'tdd-UL-DL-ConfigurationCommon' or 'tdd-UL-DL-ConfigurationDedicated')).

In this case, even if some PDSCHs are scheduled, the UE may not receive PDSCH(s) overlapping the corresponding semi-static UL symbols. The number of PDSCHs that can be scheduled for a specific PDSCH reception occasion may be greater than one. Hereinafter, a method for solving the above-mentioned problem will be described.

As an example, for a cell in which time domain bundling is configured and M-DCI (for PDSCH) is configured, one index on the TDRA table that can be scheduled by the corresponding M-DCI may schedule three consecutive slots, and the SLIV for each slot may be configured identically.

Additionally or alternatively, it is assumed that the K1 values configured for the corresponding cell are 2 and 3. According to Table 9, the type-1 HARQ-ACK codebook configuration for the PUCCH to be transmitted in slot #N may be determined based on the K1 value. For example, if the K1 value is 3, SLIV0 in slot #N-3 (which is the last SLIV) may be determined as the first PDSCH reception occasion, and when the K1 value is 2, SLIV0 in slot #N-2 (which is the last SLIV) may be determined as the second PDSCH reception occasion.

Additionally or alternatively, as shown in FIG. 9(b), it is assumed that slot #N-4/N-3 is configured as a semi-static UL slot. Even if PDSCHs are scheduled through M-DCI in the corresponding slots, the UE may consider the corresponding PDSCHs to be invalid and may not receive the corresponding PDSCHs.

For example, PDSCHs on slot #N-4/N-3/N-2 may be scheduled through M-DCI #1, and the K1 value may be indicated as 2. In addition, PDSCHs on slot #N-5/N-4/N-3 may be scheduled through M-DCI #2, and the K1 value may be indicated as 3.

In this case, the UE having received both M-DCI #1 and M-DCI #2 may receive the PDSCH at slots #N-5 and slot #N-2 (without receiving the PDSCH in slot #N-4/N-3). And, the UE may transmit HARQ-ACK information corresponding to each PDSCH through PUCCH on slot #N. In the first PDSCH reception occasion determined by Table 9, two PDSCHs on slot #N-3 scheduled by M-DCI #1 and two PDSCHs on slot #N-3 scheduled by M-DCI #2 may exist.

As described above, it is assumed that there are a plurality of PDSCHs corresponding to one PDSCH reception occasion. At this time, if there is a PDSCH corresponding to the last SLIV among a plurality of PDSCHs corresponding to a specific PDSCH reception occasion, the UE may map bundled HARQ-ACK information including the corresponding last SLIV (for the corresponding PDSCH reception occasion). When all of the plurality of PDSCHs corresponding to a specific PDSCH reception occasion do not correspond to the last SLIV, the UE may map NACK information (for the corresponding PDSCH reception occasion).

As shown in FIG. 9(b), at the first PDSCH reception occasion, a PDSCH on slot #N-3 scheduled by M-DCI #1 and a PDSCH on slot #N-3 scheduled by M-DCI #2 may exist. At this time, since the PDSCH scheduled by M-DCI #2 corresponds to the last SLIV, HARQ-ACK information for the slot #N-5 PDSCH among the slot #N-5/N-4/N-3 PDSCHs scheduled by M-DCI #2 may be mapped to the corresponding PDSCH reception occasion.

Additionally or alternatively, as shown in FIG. 9(b), when scheduling in the same slot is allowed for invalid PDSCHs, a plurality of M-DCI scheduling with one PDSCH reception occasion as the last SLIV may be possible.

As an example, as shown in FIG. 9(c), it is assumed that slot #N-3/N-2 is configured as a semi-static UL slot. Row index 0 is indicated through M-DCI #1 so that PDSCHs on slot #N-4/N-3/N-2 may be scheduled, and Row index 1 is indicated through M-DCI #2, so that PDSCHs on slot #N-5/N-3/N-2 may be scheduled.

At this time, the UE does not attempt to receive an invalid (invalid) PDSCH, and may receive slot #N-4 PDSCH scheduled through M-DCI #1 and slot #N-5 PDSCH scheduled through M-DCI #2.

However, when configuring the type-1 HARQ-ACK codebook, since the last SLIV of both PDSCHs is slot #N-2, and only one PDSCH reception occasion is determined for the two last SLIVs, ambiguity related to HARQ-ACK information for slot #N-4 PDSCH and slot #N-5 PDSCH may occur.

In this case, in the present disclosure, the UE may not expect a plurality of (M-)DCI scheduling with one PDSCH reception occasion as the last SLIV.

Figure 9:
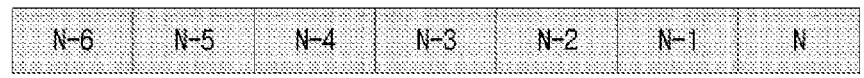
FIG. 9 is a diagram for describing a method of transmitting and receiving HARQ-ACK for a PDSCH scheduled by one DCI according to an embodiment of the present disclosure.
Figure 9:
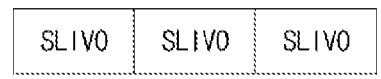
Figure 9:
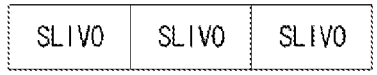
Figure 9:
Figure 9:
Figure 9:
Figure 9:
Figure 9:
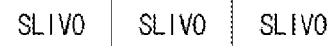
Figure 9:
Figure 9:
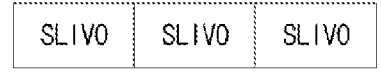
Figure 9:
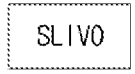
Figure 9:
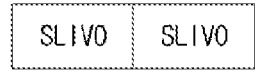

As shown in (c) of FIG. 9, when receiving M-DCI #1 in which PDSCHs on slot #N-4/N-3/N-2 are scheduled, the UE may not expect to receive an additional DCI indicating the last SLIV corresponding to the PDSCH reception occasion associated with the SLIV on the corresponding slot #N-2 (e.g., reception of M-DCI #2 scheduling PDSCHs on slot #N-5/N-3/N-2). Additionally or alternatively, the UE may ignore or drop the DCI even if it receives the additional DCI.

As another example, as shown in FIG. 9(c), when receiving M-DCI #2 in which PDSCHs on slot #N-5/N-3/N-2 are scheduled, the UE may not expect to receive an additional DCI indicating the last SLIV corresponding to the PDSCH reception occasion associated with the SLIV on the corresponding slot #N-2 (e.g., reception of M-DCI #1 scheduling PDSCHs on slot #N-4/N-3/N-2). Additionally or alternatively, the UE may ignore or drop the DCI even if it receives the additional DCI.

Embodiment 2

The above-described SPS PDSCH activation/release method through M-DCI may be extended even when the corresponding M-DCI does not schedule the PDSCH (e.g., SCell dormancy indication or TCI status update indication).

Specifically, when at least one row index among the TDRA row indexes configured for M-DCI is linked with only a single SLIV, an SCell dormancy indication or a TCI state update indication through the corresponding M-DCI may be allowed. In addition, when an SCell dormancy indication or a TCI status update indication is given through the corresponding M-DCI, the UE may expect that a TDRA row index linked with only a single SLIV is indicated.

Additionally or alternatively, even if all TDRA row indexes or some TDRA row indexes configured for M-DCI are linked with multiple SLIVs, when the SCell dormancy or TCI state update is indicated through the corresponding M-DCI, it may be allowed to indicate a TDRA row index in which a plurality of SLIVs are linked. In this case, the UE may consider only a specific SLIV (e.g., the first SLIV or the last SLIV) among a plurality of SLIVs linked to the indicated TDRA row index as valid.

The UE may determine the HARQ-ACK bit location when configuring the HARQ-ACK timing and HARQ-ACK codebook corresponding to DCI indicating SCell dormancy or TCI state update based on the specific SLIV information.

As an example, it is assumed that {slot n+1, SLIV #1} and {slot n+2, SLIV #2} are configured for the TDRA row index indicated by the M-DCI (including information indicating SCell dormancy or TCI state update) transmitted in slot n.

At this time, the HARQ-ACK timing corresponding to the corresponding DCI may be determined based on the last SLIV {slot n+2, SLIV #2}. In addition, when configuring the HARQ-ACK codebook (e.g., when configuring the type-1 HARQ-ACK codebook), the UE may transmit ACK/NACK information for the DCI to the HARQ-ACK bit position corresponding to the SLIV.

Embodiment 3

It is assumed that the number of HPNs for which HARQ operation is enabled is N (>1) among all K HPNs configured for a specific cell in which M-PDSCH DCI is configured, and the number of disabled HPNs is K-N. In this case, Embodiment 3 describes an enhanced type-2 HARQ-ACK codebook configuration method.

Additionally or alternatively, it is assumed that all K HPNs are configured for at least one cell among a plurality of cells in which M-PDSCH DCI is configured in the same PUCCH cell group. At this time, when the number of HPNs for which the HARQ operation is enabled is N (>1) and the number of HPNs that are disabled is K-N, the third embodiment describes an enhanced method of configuring the type-2 HARQ-ACK codebook.

When counting DAI for each DCI, one first sub-codebook corresponding to a single PDSCH case may be configured, and another second sub-CB corresponding to a multi-PDSCH case may be configured. Configuring an individual sub-CB may mean that a C/T-DAI value may be independently determined and signaled for each sub-CB. That is, the DCI/PDSCH order/total scheduled for each sub-CB may be independently determined/signaled.

At this time, if the number of enabled HPNs among HPNs scheduled through M-DCI (or S-DCI) is 1 or less, the UE may map the HARQ-ACK bit(s) corresponding to the corresponding DCI to the first sub-CB. In addition, when the number of enabled HPNs among HPNs scheduled through M-DCI is two or more, the UE may map the HARQ-ACK bit(s) corresponding to the corresponding DCI to the second sub-CB.

In this case, Z=min {max_HPN, max_XY} for each cell may be obtained based on the max_HPN and max_XY values for each cell (for the second sub-CB). In addition, the number of HARQ-ACK bits corresponding to one DAI value may be calculated based on the maximum value among Z values of each cell.

Here, the max_XY value may be defined as an X*Y value for a specific serving cell in which M-DCI is configured, and Y may mean the maximum number of PDSCHs that M-DCI can schedule. For example, for a cell in which 2 TB is configured and spatial bundling is not configured, X may be calculated as 2. As another example, X may be calculated as 1 for a cell in which 2 TB is configured but spatial bundling is configured or a cell in which 1 TB is configured.

In this case, max_HPN may be determined by the number of enabled HPNs and Y (that is, the maximum number of PDSCHs that M-DCI can schedule) configured for a specific serving cell in which M-DCI is configured. max_HPN may mean the maximum number of HPNs that can be allocated to Y PDSCHs.

For example, 5 enabled HPNs of {0, 2, 3, 4, 6} among a total of 8 HPNs are configured in the corresponding serving cell, and Y may be 4. When scheduling 4 consecutive PDSCHs, the maximum number of enabled HPNs that can be allocated to the corresponding 4 PDSCH windows is 3, so the max_HPN number may be 3.

Additionally or alternatively, a maximum value max_XY_total among max_XY values for a plurality of cells in which M-DCI is configured in the same PUCCH cell group may be calculated. A maximum value max_HPN_total among max_HPN values for each of a plurality of cells in which M-DCI is configured in the same PUCCH cell group may be calculated. And, the number of HARQ-ACK bits corresponding to one DAI value of the second sub-CB may be determined based on the min {max_HPN_total, max_XY_total} value.

As described above, it is assumed that the number of HARQ-ACK bits corresponding to one DAI value is calculated based on (max_XY or) min {max_HPN_total, max_XY_total}. In this case, the UE may map the HARQ-ACK bit(s) corresponding to the enabled HPN to the lowest (or highest) bit index(s) in the HARQ-ACK payload corresponding to one DAI value.

Additionally or alternatively, for HARQ-ACK bits corresponding to enabled HPN, the lower bit of the HARQ ID may be mapped to a lower (or higher) bit index, or a bit earlier at a corresponding PDSCH reception time may be mapped to a lower (or higher) bit index.

One value is indicated for HPN through M-DCI, and the indicated HPN value is increased by 1 (modulo operation if necessary) from the first (valid) PDSCH, so that each (valid) PDSCH may be mapped.

Here, a valid PDSCH may mean a PDSCH that does not overlap with a UL symbol configured by higher layer signaling (e.g., 'tdd-UL-DL-ConfigurationCommon' or 'tdd-UL-DL-ConfigurationDedicated'). As another example, an invalid PDSCH may mean a PDSCH overlapping a UL symbol configured by higher layer signaling (e.g., 'tdd-UL-DL-ConfigurationCommon' or 'tdd-UL-DL-ConfigurationDedicated').

Additionally or alternatively, when time domain bundling is configured, the HARQ-ACK bit corresponding to the PDSCH to which the disabled HPN is allocated may be treated the same as the HARQ-ACK bit corresponding to the invalid PDSCH. For example, bundling may be performed excluding PDSCH to which disabled HPN is allocated. As another example, when configuring a bundling group, a PDSCH to which a disabled HPN is allocated may be excluded.

The above-described method is not limited to the configuration of the type-2 HARQ-ACK codebook and may be equally applied to other types of codebooks (e.g., type-1 or type-3 HARQ-ACK codebook).

Figure 12:
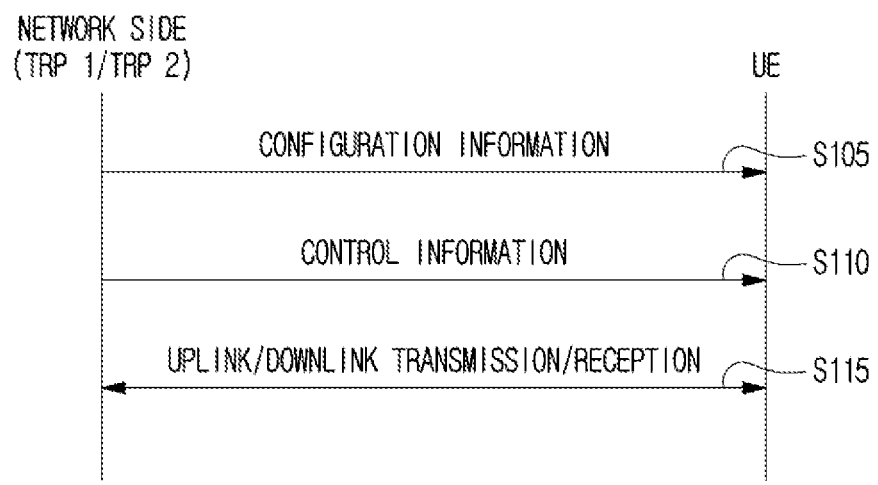
FIG. 12 is a diagram for describing a signaling procedure of a network side and a UE according to an embodiment of the present disclosure.

FIG. 12 is a diagram for describing a signaling procedure of a network side and a UE according to an embodiment of the present disclosure.

FIG. 12 represents an example of signaling between UE and a network side in M-TRP situation to which embodiments of the present disclosure (e.g., embodiment 1, embodiment 2, embodiment 3, or a combination of one or more of the detailed examples thereof) may be applied.

Figure 13:
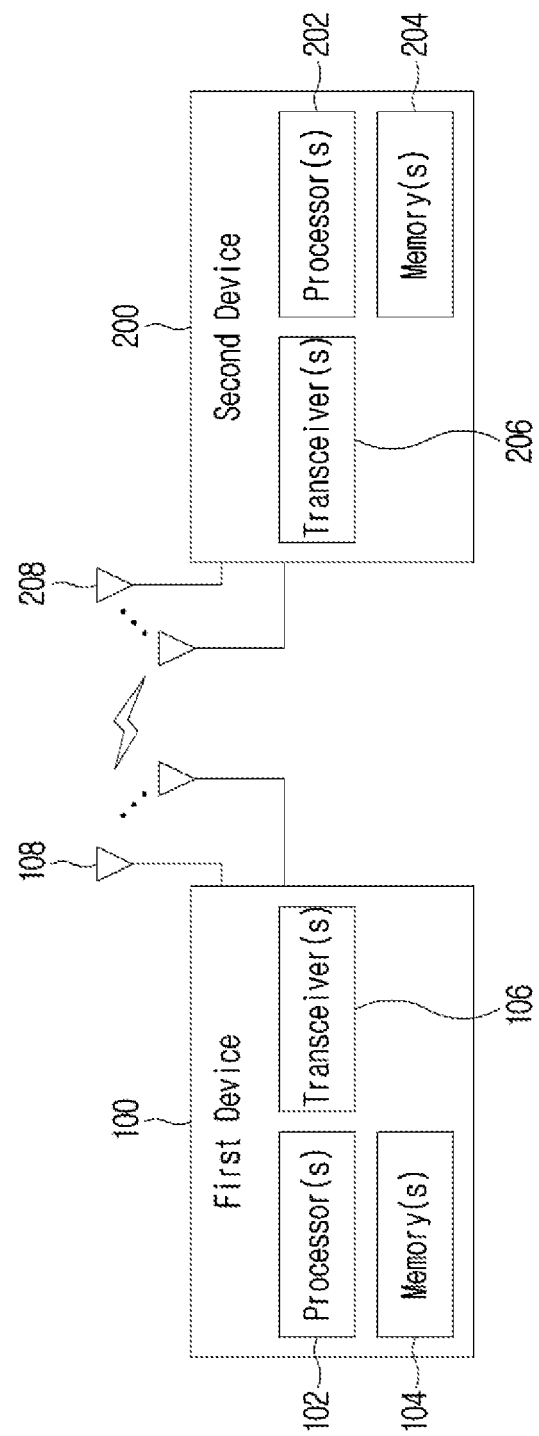
FIG. 13 illustrates a block diagram of a wireless communication device according to an embodiment of the present disclosure.

Here, UE/a network side is illustrative and may be applied by being substituted with a variety of devices as described by referring to FIG. 13. FIG. 12 is for convenience of description, and it does not limit a scope of the present disclosure. In addition, some step(s) shown in FIG. 12 may be omitted according to a situation and/or a configuration, etc. In addition, in the operation of the network side/UE of FIG. 12, the above-described uplink transmission/reception operation and the like may be referred to or used.

In the following description, the network side may be one base station including a plurality of TRPs, and may be one cell including a plurality of TRPs. Alternatively, the network side may include a plurality of remote radio heads (RRHs)/remote radio units (RRUs).

In addition, a base station may generally mean an object which performs transmission and reception of data with a UE. For example, the base station may be a concept which includes at least one TP (Transmission Point), at least one TRP (Transmission and Reception Point), etc. In addition, a TP and/or a TRP may include a panel, a transmission and reception unit, etc. of a base station.

UE may receive configuration information from a network side S105.

For example, the configuration information may include information related to a network-side configuration (i.e., TRP configuration), resource allocation information related to downlink/uplink transmission and reception, and the like.

The configuration information may be transmitted through a higher layer (e.g., RRC, MAC CE). The configuration information may include information related to uplink transmission based on a configured grant (CG). In addition, when the configuration information is predefined or configured, the corresponding step may be omitted.

As another example, the configuration information may include at least one of information related to time domain bundling (e.g., 'enableTimeDomainHARQ'), information related to spatial bundling (e.g., 'harq-ACK-Spatial-BundlingPUCCH'), and information related to CBG transmission (e.g., 'PDSCH-CodeBlockGroupTransmission').

As another example, the configuration information may include information related to at least one TDRA row including a plurality of SLIVs for the PDSCH (e.g., 'pdsch-TimeDomainAllocationListForMultiPDSCH').

As another example, the configuration information may include information related to M-DCI, HARQ-ACK codebook (e.g., type of HARQ-ACK codebook, etc.), and information related to TCI status.

For example, an operation that UE (100 or 200 in FIG. 13) in the above-described steps S105 receives the configuration information from a network side (200 or 100 in FIG. 13) may be implemented by a device in FIG. 13 which will be described after. For example, in reference to FIG. 13, at least one processor 102 may control at least one transceiver 106 and/or at least one memory 104, etc. to receive the configuration information and at least one transceiver 106 may receive the configuration information from a network side.

The UE may receive control information from the network side S110.

Specifically, the UE may receive M-DCI/S-DCI from the network side. As an example, M-DCI/S-DCI may include information for scheduling DL/UL. As another example, M-DCI/S-DCI may include indication information of the TCI state and not DL assignment information. As another example, M-DCI/S-DCI may include information indicating SCell dormancy and may not include information for scheduling PDSCH.

In addition, when the control information is predefined or configured, the corresponding step may be omitted.

For example, the operation of the UE (100 or 200 in FIG. 13) of the above-described step S110 receiving the control information from the network side (200 or 100 in FIG. 13) may be implemented by the apparatus of FIG. 13 to be described below. For example, referring to FIG. 13, the one or more processors 102 may control one or more transceivers 106 and/or one or more memories 104, etc. to receive the control information, and the one or more transceivers 106 may receive the control information from a network side.

The UE may transmit an uplink to the network side or receive a downlink S115.

As an example, the UE may transmit a HARQ-ACK codebook including HARQ-ACK information for the TCI state indication to the network side through the PUCCH. As another example, the UE may transmit HARQ-ACK information for DCI including information indicating SCell dormancy and not including information for scheduling PDSCH to the network side through PUCCH.

As another example, the UE may receive one or more PDSCHs scheduled by DCI from the network side. In addition, the UE may transmit HARQ-ACK information for one or more PDSCHs to the network side through the PUCCH.

The UE may perform uplink transmission or downlink reception based on the embodiments of the present disclosure (e.g., embodiment 1, embodiment 2, embodiment 3, or a combination of one or more of detailed embodiments thereof).

For example, the operation in which the UE (100 or 200 in FIG. 13) transmits an uplink to the network side (200 or 100 in FIG. 13) or receives a downlink from the network side (200 or 100 in FIG. 13) in step S115 described above may be implemented by the apparatus of FIG. 13 to be described below.

For example, referring to FIG. 13, the one or more processors 102 may control one or more transceivers 106 and/or one or more memories 104 to transmit an uplink or receive a downlink, and the one or more transceivers 106 to transmit an uplink or receive a downlink to the network side General Device to which the Present Disclosure May be Applied FIG. 13 is a diagram which illustrates a block diagram of a wireless communication system according to an embodiment of the present disclosure.

In reference to FIG. 13, a first device 100 and a second device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts included in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts included in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts included in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts included in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts included in the present disclosure. One or more processors 102, 202 may generate a signal (e.g., a baseband signal)

including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts included in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts included in the present disclosure may be implemented by using a firmware or a software and a firmware or a software may be implemented to include a module, a procedure, a function, etc. A firmware or a software configured to perform description, functions, procedures, proposals, methods and/or operation flow charts included in the present disclosure may be included in one or more processors 102, 202 or may be stored in one or more memories 104, 204 and driven by one or more processors 102, 202. Description, functions, procedures, proposals, methods and/or operation flow charts included in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. included in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. included in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefore, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

What is claimed is:

1. A method comprising:
receiving, by a user equipment (UE) from a base station, configuration information related to at least one time domain resource allocation (TDRA) row including at least one start and length indicator value (SLIV) for at least one physical downlink shared channel (PDSCH); and
receiving, by the UE from the base station, first downlink control information (DCI),
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

2. The method of claim 1, wherein:
based on the first DCI being received from the base station, a HARQ-ACK codebook including first HARQ-ACK information for the TCI state indication is transmitted to the base station.

3. The method of claim 2, wherein:
a location of the first HARQ-ACK information on the HARQ-ACK codebook is same as a location of HARQ-ACK information for PDSCH reception when the PDSCH reception with at least one decoded code block group (CBG) or at least one transport block is scheduled by the first DCI.

4. The method of claim 1, wherein:
the DL assignment information includes information for scheduling the at least one PDSCH.

5. The method of claim 1, wherein:
the TCI state indication information includes information for updating at least one DL reference signal (RS) having a quasi-colocation (QCL) relationship.

6. A user equipment (UE) comprising:
at least one transceiver; and
at least one processor connected to the at least one transceiver,
wherein the processor is configured to:
receive, from a base station, configuration information related to at least one time domain resource allocation (TDRA) row including at least one start and length indicator value (SLIV) for at least one physical downlink shared channel (PDSCH) through the at least one transceiver; and
receive, from the base station, first downlink control information (DCI) through the at least one transceiver,
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

7. A method comprising:
transmitting, by a base station to a user equipment (UE), configuration information related to at least one time domain resource allocation (TDRA) row including at least one start and length indicator value (SLIV) for at least one physical downlink shared channel (PDSCH); and
transmitting, by the base station to the UE, first downlink control information (DCI),
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

8. A base station comprising:
at least one transceiver; and
at least one processor connected to the at least one transceiver,
wherein the processor is configured to:
transmit, to a user equipment (UE), configuration information related to at least one time domain resource allocation (TDRA) row including at least one start and length indicator value (SLIV) for at least one physical downlink shared channel (PDSCH) through the at least one transceiver; and
transmit, to the UE, first downlink control information (DCI) through the at least one transceiver,
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

9. A processing device configured to control a user equipment (UE), the processing device comprising:
at least one processor; and
at least one computer memory operatively coupled to the at least one processor and storing instructions for performing operations upon being executed by the at least one processor,
wherein the operations comprise:
receiving, from a base station, configuration information related to at least one time domain resource allocation (TDRA) row including at least one start and length indicator value (SLIV) for at least one physical downlink shared channel (PDSCH); and
receiving, from the base station, first downlink control information (DCI),
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

10. At least one non-transitory computer readable medium storing at least one instruction, wherein:
the at least one instruction executed by at least one processor controls a device to perform:
receiving, from a base station, configuration information related to at least one time domain resource allocation (TDRA) row including at least one start and length indicator value (SLIV) for at least one physical downlink shared channel (PDSCH); and
receiving, from the base station, first downlink control information (DCI),
wherein the first DCI includes transmission configuration indicator (TCI) state indication information and does not include downlink (DL) assignment information,
wherein, based on a second DCI including information indicating secondary cell (SCell) dormancy and not including information for scheduling a PDSCH being received from the base station, hybrid automatic repeat request (HARQ)-acknowledgement (ACK) information for the second DCI is transmitted to the base station, and a value of the HARQ-ACK information is ACK, and
wherein a number of SLIVs in a specific TDRA row indicated by the first DCI among the at least one TDRA row is 1.

* * * * *